(12) United States Patent
Gobin et al.

(10) Patent No.: US 9,266,172 B2
(45) Date of Patent: Feb. 23, 2016

(54) METHOD FOR SYNTHESIZING SELF-ASSEMBLING NANOPARTICLES

(71) Applicants: Andre M. Gobin, Houston, TX (US); Dhruvinkumar Patel, Louisville, KY (US); Kurtis T. James, Louisville, KY (US); Guandong Zhang, Mishawaka, IN (US)

(72) Inventors: Andre M. Gobin, Houston, TX (US); Dhruvinkumar Patel, Louisville, KY (US); Kurtis T. James, Louisville, KY (US); Guandong Zhang, Mishawaka, IN (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 323 days.

(21) Appl. No.: 13/895,102

(22) Filed: May 15, 2013

(65) Prior Publication Data

US 2013/0305881 A1    Nov. 21, 2013

Related U.S. Application Data

(60) Provisional application No. 61/647,586, filed on May 16, 2012.

(51) Int. Cl.
*B22F 9/24* (2006.01)
*C01G 7/00* (2006.01)
*B22F 9/16* (2006.01)
*B22F 1/00* (2006.01)

(52) U.S. Cl.
CPC ... *B22F 9/16* (2013.01); *B22F 9/24* (2013.01); *C01G 7/00* (2013.01); *B22F 1/0018* (2013.01); *C01P 2002/82* (2013.01); *C01P 2004/03* (2013.01); *C01P 2004/04* (2013.01); *C01P 2004/32* (2013.01)

(58) Field of Classification Search
None
See application file for complete search history.

(56) References Cited

U.S. PATENT DOCUMENTS

| | | | |
|---|---|---|---|
| 2008/0166706 A1* | 7/2008 | Zhang et al. | 435/6 |
| 2010/0152077 A1* | 6/2010 | Allston et al. | 508/165 |
| 2011/0064665 A1 | 3/2011 | Gobin et al. | |
| 2011/0064676 A1 | 3/2011 | Gobin et al. | |

OTHER PUBLICATIONS

Junhui He, et al., Facile in Situ Synthesis of Noble Metal Nanoparticles in Porous Cellulose Fibers, Chem. Mater. 2003, 15, 4401-4406.

* cited by examiner

*Primary Examiner* — George Wyszomierski
(74) *Attorney, Agent, or Firm* — Brian W. Chellgren; James C. Eaves, Jr.; Bingham Greenebaum Doll LLP

(57) ABSTRACT

Embodiments disclosed herein relate to a method for synthesizing self-assembling nanoparticles with defined plasmon resonances. More particularly, certain embodiments disclosed herein relate to an improved method for synthesizing self-assembling gold/gold sulfide nanoparticles by dialyzing samples during the self-assembly process.

22 Claims, 25 Drawing Sheets

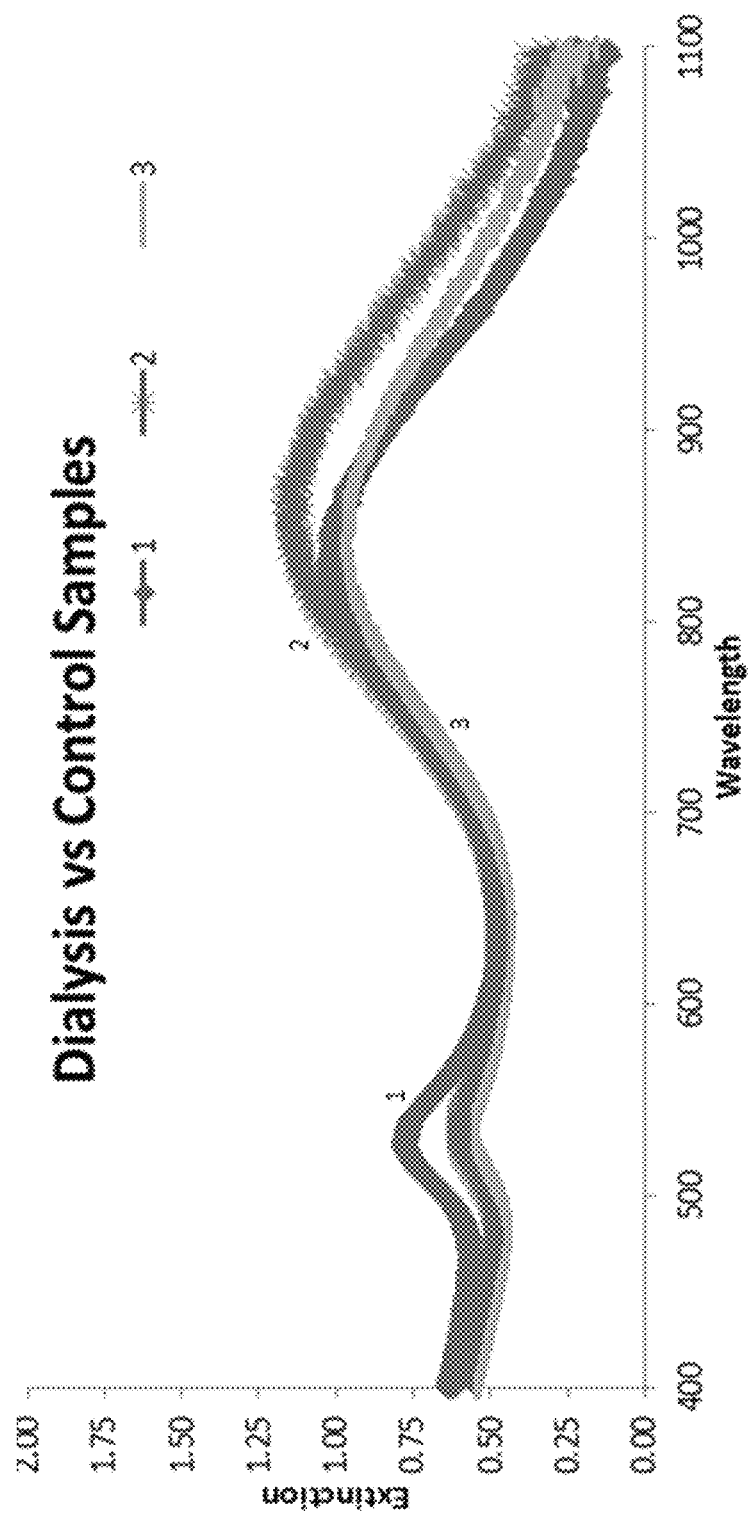

METHOD FOR SYNTHESIZING SELF-ASSEMBLING NANOPARTICLES

CROSS-REFERENCE TO RELATED APPLICATION

This application claims the benefit of priority to U.S. Provisional Patent Application Ser. No. 61/647,586, filed May 16, 2012, entitled METHOD FOR SYNTHESIZING SELF-ASSEMBLING NANOPARTICLES, incorporated herein by reference.

FIELD

Embodiments disclosed herein relate to a method for synthesizing self-assembling nanoparticles with defined plasmon resonances. More particularly, certain embodiments disclosed herein relate to an improved method for synthesizing self-assembling gold/gold sulfide nanoparticles by dialyzing samples during the self-assembly process.

BACKGROUND

U.S. application Ser. Nos. 12/807,792 and 12/807,793 (the "'792 and '793 applications"), incorporated herein by reference in their entireties, disclose gold/gold sulfide ("GGS") nanoparticles within a chitosan matrix, and methods for synthesizing and using the same. These references disclose forming GGS nanoparticles by self-assembly of a sulfide source, such as sodium thiosulfate, and a gold source, such as cholorauric acid. GGS nanoparticles have absorbance peaks in the near infra-red ("NIR") region, which are tunable by varying the self-assembly conditions. During self-assembly of GGS nanoparticles, gold colloid is simultaneously formed as a byproduct. In the '792 and '793 applications, gold colloid particles were removed using one, or more commonly three, rounds of centrifugation.

SUMMARY

Embodiments disclosed herein relate to a method for synthesizing self-assembling nanoparticles. More particularly, certain embodiments disclosed herein relate to an improved method for synthesizing self-assembling GGS nanoparticles by dialyzing samples during the self-assembly process. In some embodiments, the method for synthesizing GGS nanoparticles disclosed herein provides a higher ratio of GGS nanoparticles to gold colloid as compared to the method cited in the '792 and '793 applications.

In some embodiments, the present invention pertains to a method for making hybrid nanoparticles, including combining a gold source and a sulfide source in a first chamber, the first chamber being separated from a second chamber by a semipermeable membrane, wherein the gold source and sulfide source self-assemble into hybrid nanoparticles. In further embodiments, the hybrid nanoparticles comprise gold and gold sulfide.

In further embodiments, the gold source is a gold salt, such as, for example, chloroauric acid, sodium tetrachloroaureate (III) dehydrate, or a mixture thereof. In certain embodiments, the sulfide source is a sulfide salt, such as, for example, sodium thiosulfate, sodium sulfide, or a mixture thereof.

In certain embodiments, the combining occurs at room temperature. In some embodiments, the nanoparticles have an absorbance peak between 700 nm and 1100 nm.

In further embodiments, the nanoparticles have a tunable absorbance peak. In some embodiments, the method includes tuning the absorbance peak by adjusting the ratio of gold source and sulfide source. In further embodiments, the semipermeable membrane has a molecular weight cut off ("MWCO") and the method includes tuning the absorbance peak by selecting the MWCO of the semipermeable membrane. In certain embodiments, the MWCO is between about 2 KDa and about 20 KDa, between about 2 KDa and about 12 KDa, or about 12 KDa. In some embodiments, the semipermeable membrane has a surface area, the gold source and sulfide source have a combined volume, and the method includes tuning the absorbance peak by adjusting a ratio of the surface area to the combined volume. In certain embodiments, the ratio of the surface area to the combined volume is between about 220 $mm^2/mL$ and about 470 $mm^2/mL$. In further embodiments, the gold source and sulfide source in the first chamber are dialyzed against a dialysate in the second chamber for a period of time, and further comprising tuning the absorbance peak by adjusting the period of time. In certain embodiments, the method includes tuning the absorbance peak by adjusting the temperature.

In some embodiments, the nanoparticles have a quality ratio greater than 1.8, greater than 2.0, or greater than 2.3, without centrifugation of the nanoparticles.

In some embodiments, the present invention pertains to a method for making a hybrid nanoparticle including adding a first chemical species to a first chamber, and adding a second chemical species to a second chamber, the first chamber being separated from a second chamber by a semipermeable membrane having a MWCO, wherein the first chemical species and second chemical species self-assemble into hybrid nanoparticles. In further embodiments, the first chemical species is a gold source and the second chemical species is a sulfide source.

In some embodiments, the present invention pertains to a method for self-assembly of hybrid nanoparticles including separating a first chamber from a second chamber using a semipermeable membrane, adding a gold source and a sulfide source to the first chamber, and adding water to the second chamber, whereby production of GGS nanoparticles is greater in the first chamber than in the second chamber, and production of gold colloid is greater in the second chamber than in the first chamber.

This summary is provided to introduce a selection of the concepts that are described in further detail in the detailed description and drawings contained herein. This summary is not intended to identify any primary or essential features of the claimed subject matter. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein.

BRIEF DESCRIPTION OF THE DRAWINGS

A better understanding of the present invention will be had upon reference to the following description in conjunction with the accompanying drawings, wherein:

FIGS. 8A-8C are spectral scans of samples from Example 6;

DETAILED DESCRIPTION OF THE PREFERRED EMBODIMENT

Figure 1:
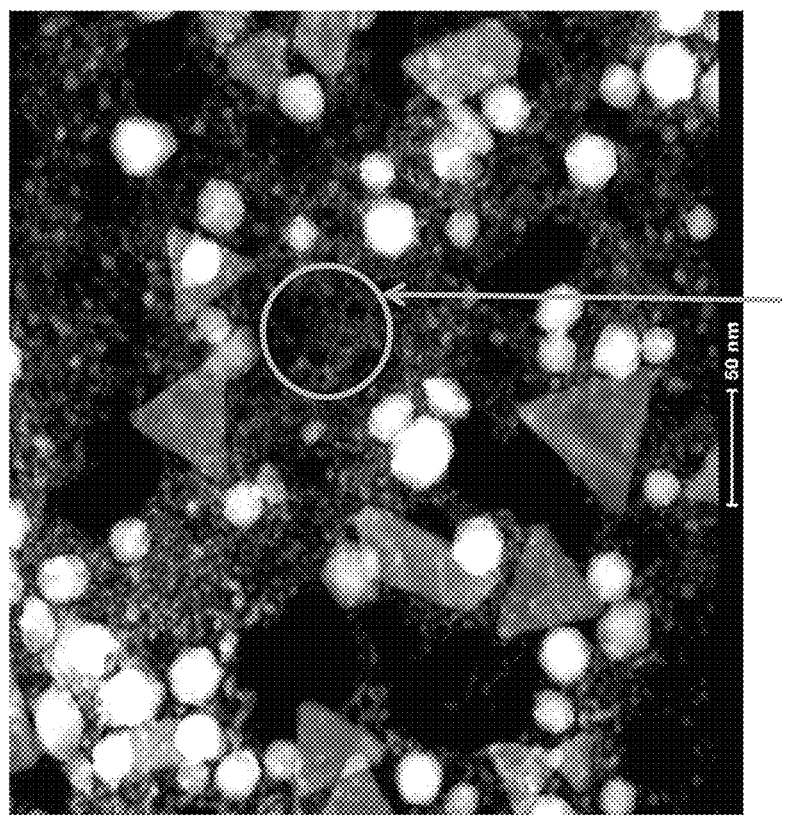
FIG. 1 is a TEM image of a sample including GGS nanoparticles and gold colloid.

For purposes of promoting an understanding of the principles of the invention, reference will now be made to one or more selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. One embodiment of the invention is shown in great detail, although it will be apparent to those skilled in the relevant art that some features or some combinations of features may not be shown for the sake of clarity.

GGS nanoparticles are preferably created by the self-assembly of a sulfide source and a gold source. In some embodiments, the sulfide source is a sulfide salt. In certain embodiments, the sulfide source is sodium thiosulfate ($Na_2S_2O_3$), sodium sulfide ($Na_2S$), or other suitable sulfur-containing chemical or mixture of chemicals. In some embodiments, the gold source is a gold salt. In some embodiments, the gold source is chloroauric acid ($HAuCl_4$), sodium tetrachloroaurate(III) dehydrate ($NaAuCl_4$), or other suitable gold-containing chemical or mixture of chemicals. The absorbance peak of GGS nanoparticles can be controlled by (1) adjusting the ratio of sodium thiolsulfate and chloroauric acid solutions used to create the GGS nanoparticles, (2) adjusting the concentration of sodium thiolsulfate and chloroauric acid, (3) adjusting the temperature, (4) adjusting the physical state of the gold and sulfide solutions through (a) agitation, (b), pre-mixing the solutions prior to dialysis, or (c) a combination of (a) and (b), (5) adjusting the molecular weight cut off of the semipermeable membrane used in dialysis or as a reaction vessel, (6) adjusting the dialysate used for the dialysis reaction, and (7) adjusting the ratio of surface area of the semipermeable membrane to the volume of the combined gold and sulfide sources within the membrane. Using manufacturing methods disclosed herein, stable GGS nanoparticles may be produced with absorbance peaks between about 700 nm and about 1100 nm. In certain embodiments, where the GGS nanoparticles are intended to be excited by a laser, the nanoparticles are selectively manufactured to have an absorbance peak substantially identical to the wavelength of the laser to maximize energy absorption.

Referring now to FIG. 1, gold colloid is a byproduct of GGS nanoparticle self-assembly. Gold colloid has an absorbance peak at 530+/−20 nm. FIG. 1 shows a sample of GGS nanoparticles with contaminating gold colloid produced by the single step assembly method disclosed in the '792 and '793 applications, prior to any separation steps. In the methods disclosed in the '792 and '793 applications, GGS nanoparticles are separated from gold colloid by centrifugation. An example separation process is centrifugation at 1000 g for 20 minutes. Additional centrifugation steps may be used to increase purity. While effective in separating gold colloid from GGS nanoparticles, centrifugation decreases the GGS nanoparticle yield.

Figure 2:
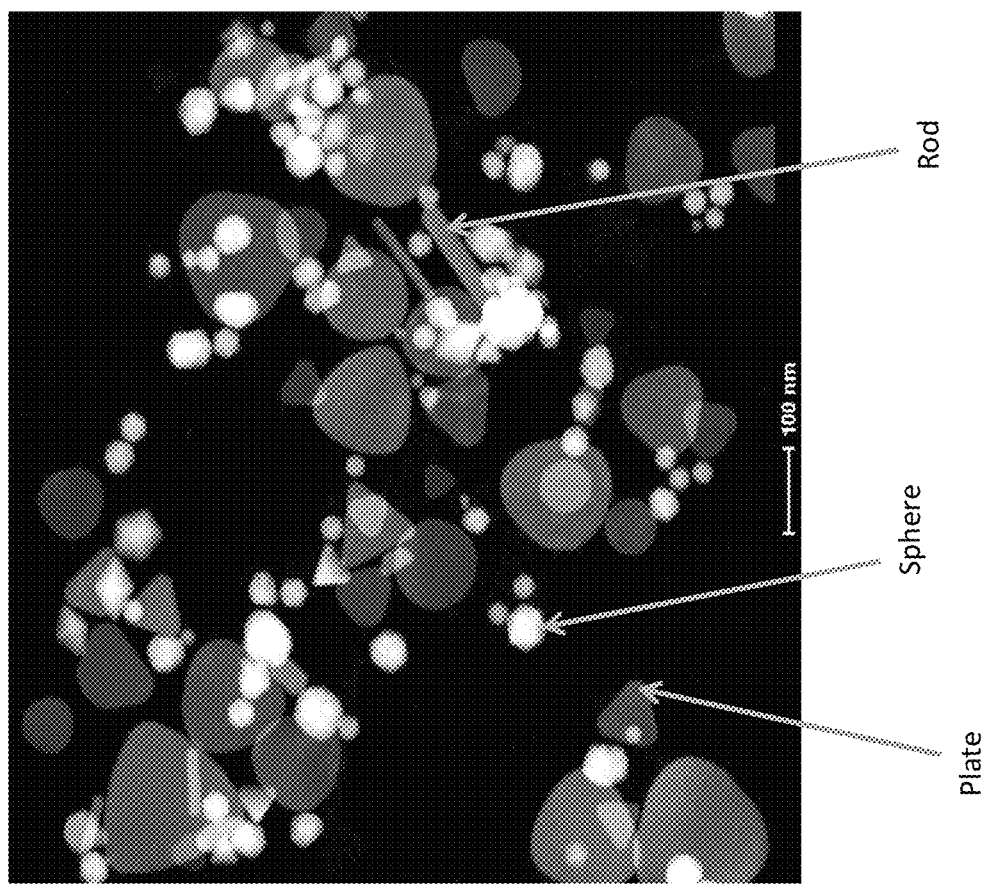
FIG. 2 is a TEM image of a sample including GGS nanoparticles.

Referring now to FIG. 2, a sample of GGS nanoparticles produced by the disclosed method is shown. Substantially no gold colloid is visible in the image. As shown, GGS nanoparticles are formed in a several shapes, including rods, generally triangular plates, and generally spherical bodies. The term "GGS nanoparticles" is not shape specific and includes particles of particular shapes and mixtures of shapes. The shape of individual GGS nanoparticles within a sample affects the overall absorbance spectrum of the sample. Rod-shaped particles, when oriented on end, provide an absorbance peak at about 530 nm. Therefore, even when substantially all gold colloid is removed from a sample, a measure of absorbance at about 530 nm may still be present. Analysis has shown that the disclosed method produces a nanoparticle shape distribution of 78%±3% spherical, 20%±3% generally triangular plates, and 2%±1% other shapes, including rods.

In some embodiments, a sample contains a gold source and a sulfide source which self-assemble into GGS nanoparticles and gold colloid. The sample is placed in a semipermeable membrane configured to exclude based on size, sometimes referred to as a dialysis membrane, and dialyzed against deionized ("DI") water or other dialysate during the self-assembly process. In certain embodiments, the gold source and sulfide source are blended in a bag-shaped dialysis membrane. In other embodiments, the gold source and sulfide source are blended together for a specific length of time then transferred into a bag-shaped dialysis membrane which serves as a reaction vessel. In certain embodiments, the gold source and sulfide source are blended in a first chamber, the first chamber being separate from a second chamber by a dialysis membrane. In certain embodiments, the second chamber may be a re-circulating or purged flow water bath. In certain embodiments, the first chamber may be a flow-through dialysis cell. In some embodiments, the gold source and sulfide source are dialyzed against water. In further embodiments, the gold source is dialyzed against the sulfide source. In some embodiments, the sulfide source is dialyzed against the gold source. In certain embodiments, the gold source and sulfide source are combined and dialyzed against a dialysate, such as, for example, water, a salt solution, a glycerol solution, or sodium citrate. In one embodiment, the salt solution is a sodium chloride solution.

As shown in the examples below, variation in the dialysis time, the molecular weight cut off ("MWCO") of the dialysis membrane, and the ratio of gold source to sulfide source modifies the quality ratio of the resulting product and the wavelength of the absorbance peak. Without being bound by theory, it is hypothesized that dialysis performed during the self-assembly process forces ion-exchange across the membrane, providing a change in reaction kinetics. This hypothesized change in kinetics results in a shift in the equilibrium of the self-assembly reaction which favors GGS nanoparticle production within the dialysis membrane and gold colloid production outside the membrane.

A "quality ratio" is the ratio of the absorbance of synthesized particles in the near infrared ("NIR") region (700 nm to 1100 nm, for the purposes of this calculation), which corresponds to absorbance characteristics of GGS nanoparticles, relative to absorbance at 530+/−20 nm, which corresponds to the absorbance characteristics of gold colloid. Early GGS synthesis methods provided quality ratios in the range of 0.4-0.8 prior to any separation steps, such as centrifugation. The one-step synthesis method disclosed in the '792 and '793 applications provided quality ratios in the range of 0.7-1.0, then about 1.7-2.0 after centrifugation. The method disclosed herein has provided quality ratios above 1.8, above 2.0, and above 2.3, without centrifugation, indicating a significantly higher yield of GGS nanoparticles.

The examples herein disclose the use of semipermeable membranes to improve the yield of self-assembled GGS nanoparticles. However, semipermeable membranes may be used to improve the yield of other self-assembling nanoparticles as well. In further embodiments, a first chemical species and a second chemical species are blended in a first chamber, the first chamber being separated from a second chamber by a dialysis membrane, wherein the first chemical species and the second chemical species self-assemble into a nanoparticle. In certain embodiments, the first chemical species is a gold source and the second chemical species is a sulfide source.

In some embodiments, the first chamber is a dialysis membrane shaped to form a bag and the second chamber is a liquid-filled beaker, vial, vat, tank, bucket, or other container in which the first chamber is placed. In other embodiments, the first and second chambers are subsections of a larger chamber, the subsections being separated by a semipermeable membrane. In other embodiments, a first chemical species may be dialyzed against the second chemical species to form self-assembling nanoparticles. In these embodiments, a first chemical species is added into a first chamber and a second chemical species is added into a second chamber, the first chamber and second chamber being separated by a semipermeable membrane.

The following examples are provided to illustrate certain specific features of working embodiments and general protocols. The scope of the present invention is not limited to those features exemplified by the following examples. Spectral scans disclosed in the examples were obtained using a UV/Vis spectrophotometer (Carey 50 Varian), and all disclosed wavelengths are in nanometer units. Nanometer-scale images were obtained using a tunneling electron microscope ("TEM") (200 kV FEI Tecnai F20).

EXAMPLE 1

Fill a 1 L beaker with 800 mL of DI water and include a stir bar. Add a mixture of 11 mL of 2 mM $HAuCl_4$ and 3 mL of 3 mM $Na_2S_2O_3$ in a 3500 Molecular Weight Cut Off ("MWCO") dialysis membrane and insert in the beaker for 1 hour (sample 1). In this example, the interior of the dialysis membrane serves as the first chamber and the beaker serves as the second chamber. For a non-dialysis control sample, 11 mL of 2 mM $HAuCl_4$ and 3 mL of 3 mM $Na_2S_2O_3$ are mixed in a 50 mL tube and reacted for 1 hour (sample 2). Fill a second 1 L beaker with 3 mM $Na_2S_2O_3$. Add 25 mL of 2 mM $HAuCl_4$ in a 3500 MWCO dialysis membrane to the second beaker and let it react for 1 hour (sample 3).

Figure 3:
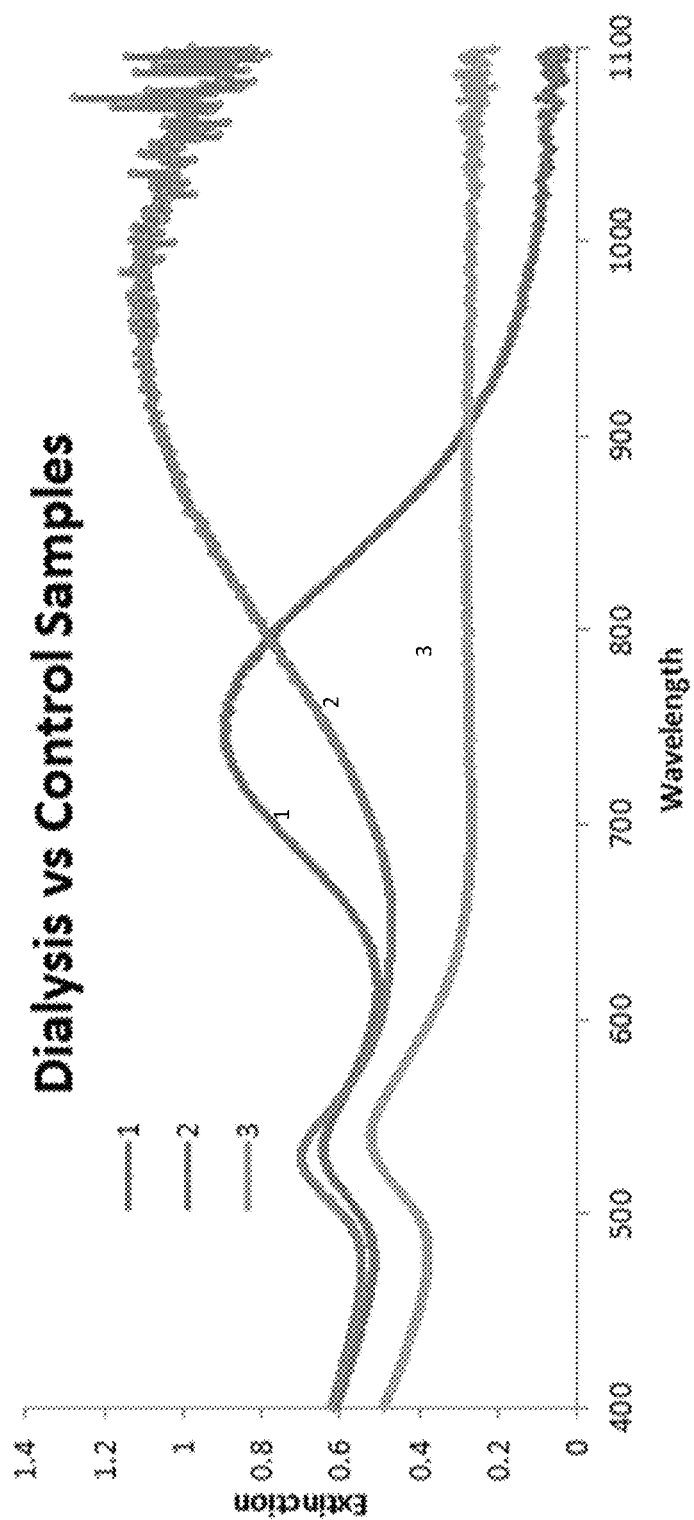
FIG. 3 is a spectral scan of samples from Example 1.

Spectral scans of the samples are shown in FIG. 3. Sample 1 has a peak at attributable to gold colloid and a strong, distinct peak in the NIR range attributable to GGS nanoparticles. Sample 2 has a peak attributable to gold colloid and strong absorbance NIR range and extending into longer wavelengths. Sample 3 has a peak absorbance at about 530 nm and no peak in the 700-900 nm range, indicating the formation only of gold colloid.

EXAMPLE 2

Fill a 1 L beaker with 800 mL of DI water and include a stir bar. Add a mixture of 11 mL of 2 mM $HAuCl_4$ and 3 mL of 3 mM $Na_2S_2O_3$ in a 3500 MWCO dialysis membrane to the beaker for 1 hour (sample 1). For a non-dialysis sample (sample 2), 11 mL of 2 mM $HAuCl_4$ and 3 mL of 3 mM $Na_2S_2O_3$ are mixed in a 50 mL tube and reacted for 1 hour. Separately, fill two 1 L beakers with 3 mM $Na_2S_2O_3$. To each beaker, add 25 mL of 2 mM $HAuCl_4$ in a 3500 MWCO dialysis membrane and let them react for 2.5 and 5 hours, respectively (samples 3 and 4).

Figure 4:
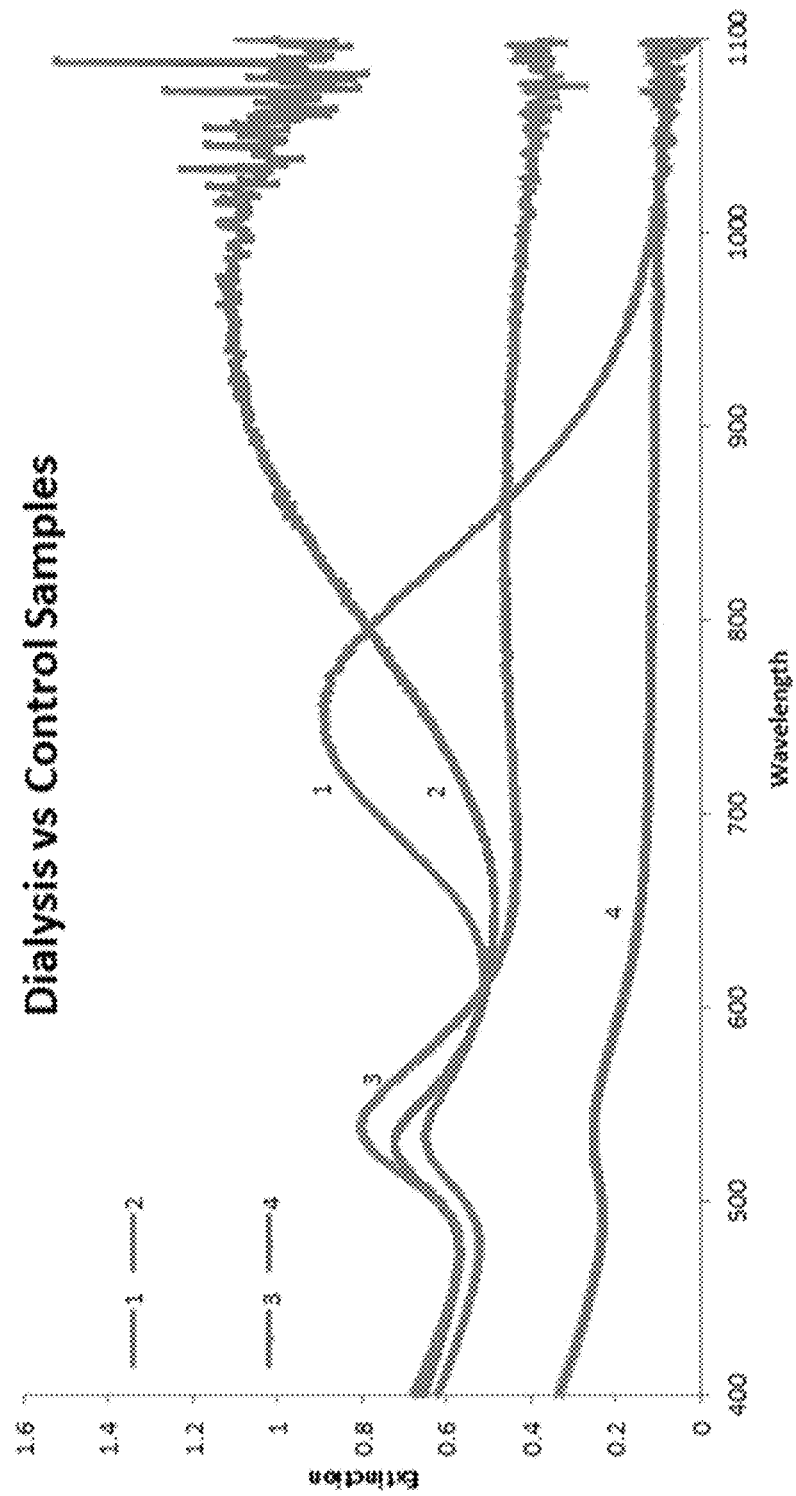
FIG. 4 is a spectral scan of samples from Example 2.

Spectral scans of the samples are shown in FIG. 4. As shown, samples 3 and 4 have negligible GGS nanoparticle formation.

EXAMPLE 3

Fill four 1 L beakers with 800 mL of DI water and stir bar. Place a mixture of 11 mL of 2 mM $HAuCl_4$ and 2 mL of 3 mM $Na_2S_2O_3$ in a 3500 MWCO dialysis membrane into two beakers for 1 and 2 hours, respectively (samples 2 and 3 of FIG. 5A). Place a mixture of 11 mL of 2 mM $HAuCl_4$ and 3 mL of 3 mM $Na_2S_2O_3$ in a 3500 MWCO dialysis membrane into two beakers for 1 and 2 hours (samples 2 and 3 of FIG. 5B). For a non-dialysis sample (sample 1 of FIGS. 5A and 5B), 11 mL of 2 mM $HAuCl_4$ and 2 or 3 mL of 3 mM $Na_2S_2O_3$ are mixed in a 50 mL tube and reacted for 1 hr.

Figure 5A:
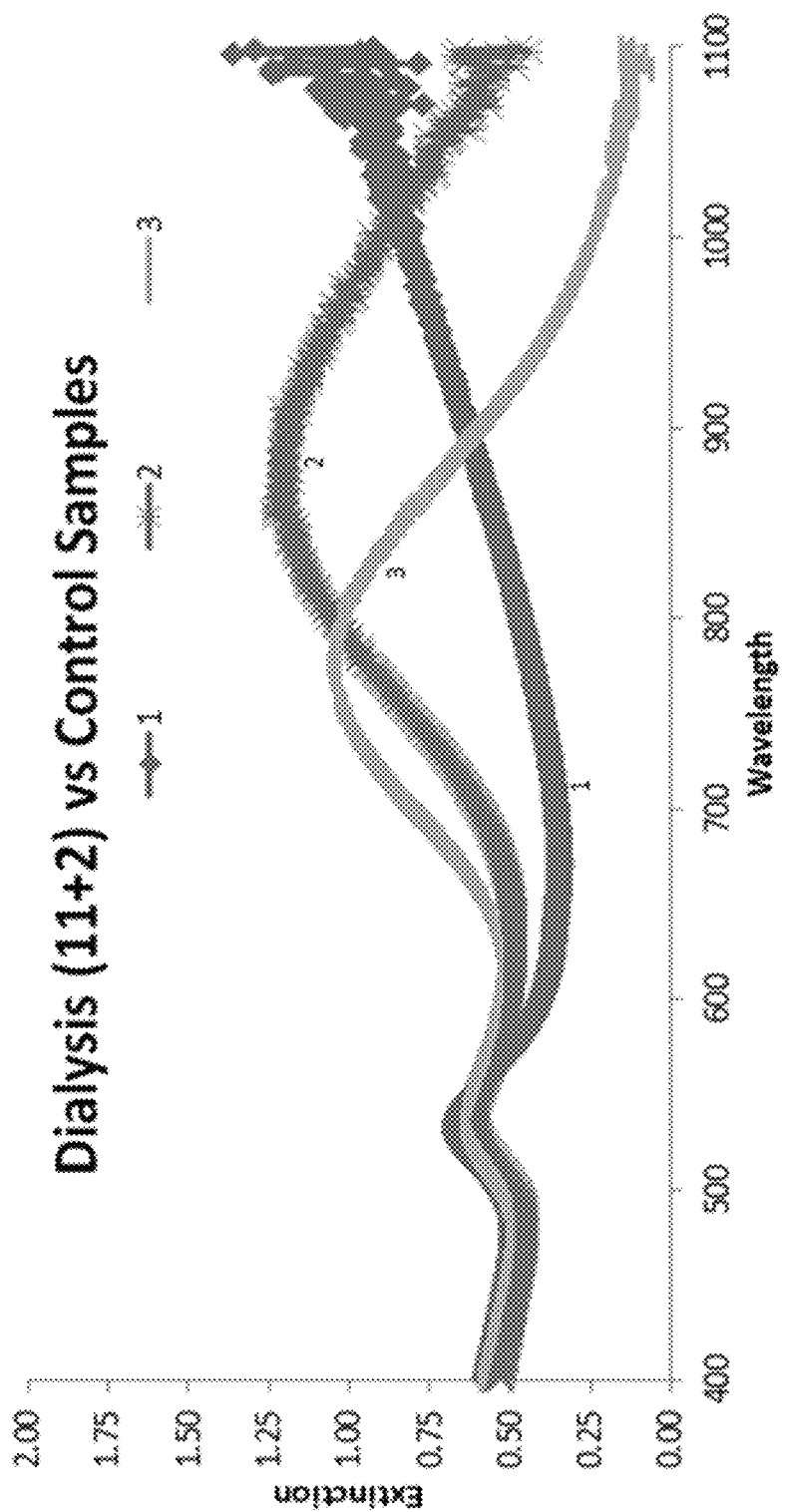
FIGS. 5A-5B are spectral scans of samples from Example 3.
Figure 5B:
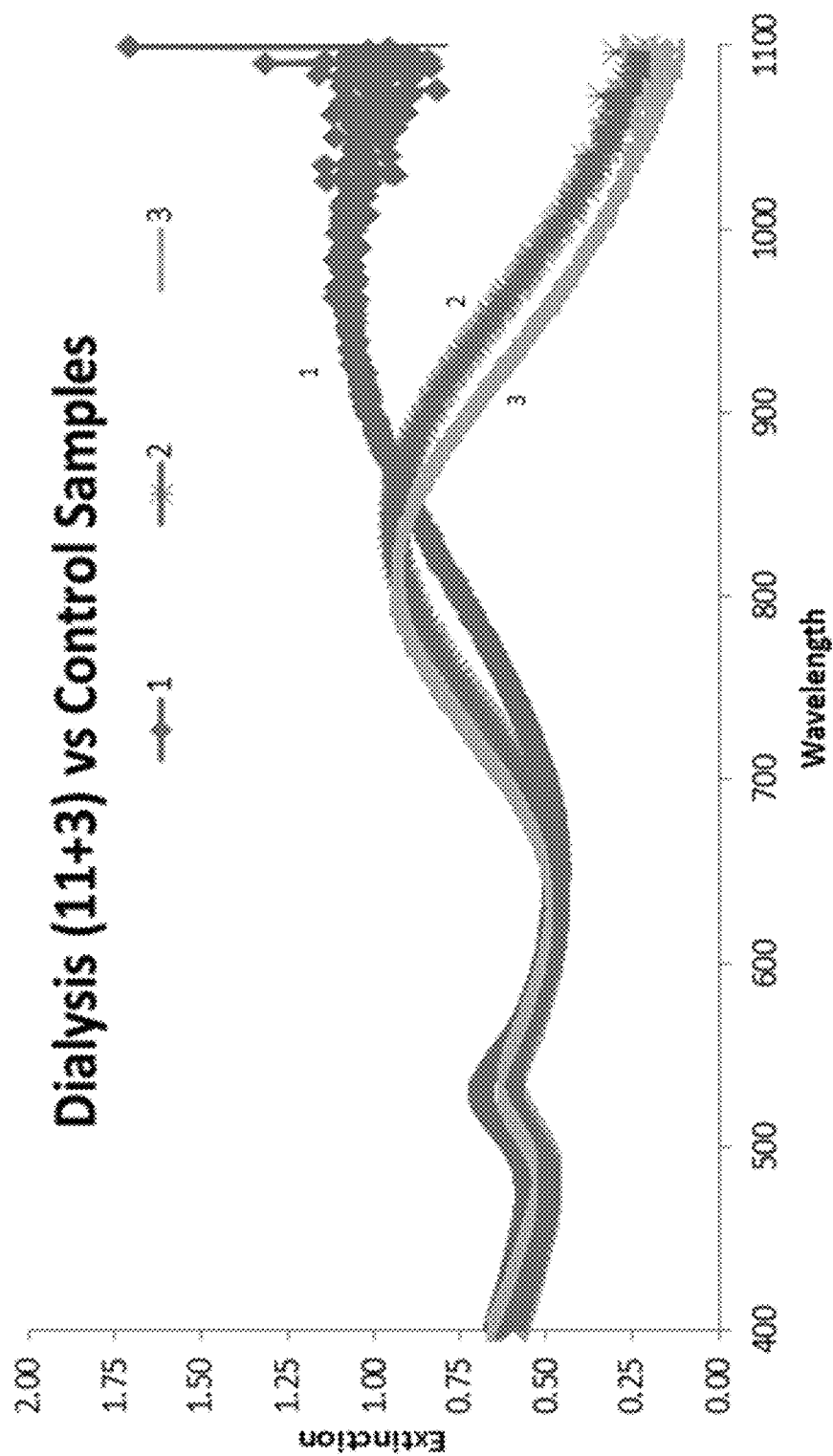

Spectral scans of the samples are shown in FIGS. 5A and 5B. As shown, the sample of 11 mL of 2 mM $HAuCl_4$ and 2 mL of 3 mM $Na_2S_2O_3$ dialyzed in a 3500 MWCO dialysis membrane produces the largest peak shift in the NIR range.

EXAMPLE 4

Fill two 1 L beakers with 800 mL of DI water and stir bar. Maintain a water temperature of about 100° C. Add a mixture of 11 mL of 2 mM $HAuCl_4$ and 3 of 3 mM $Na_2S_2O_3$ in a 3500 MWCO dialysis membrane for a 5 minute soak (sample 1). Add a mixture of 11 mL of 2 mM $HAuCl_4$ and 2 mL of 3 mM $Na_2S_2O_3$ in a 3500 MWCO dialysis membrane for a 15 minute soak (sample 2).

Figure 6:
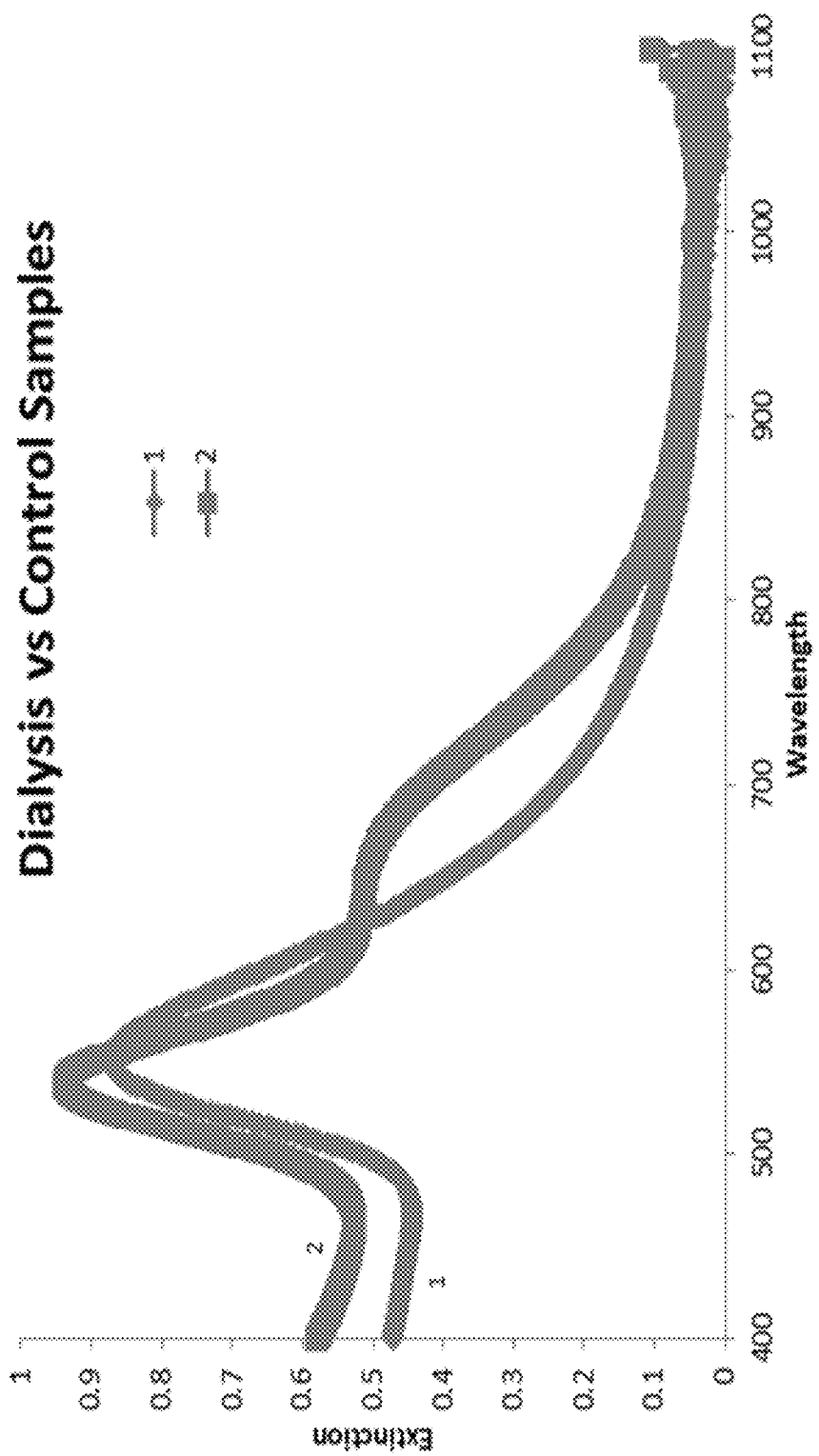
FIG. 6 is a spectral scan of samples from Example 4.

As shown in FIG. 6, neither sample produced a peak in the NIR range.

EXAMPLE 5

Fill an 8 L bucket with DI water and stir bar. In a 1-step method, a mixture of 11 mL of 2 mM $HAuCl_4$ and 3 mL of 3 mM $Na_2S_2O_3$ in a 3500 MWCO dialysis membrane is added for 1 hour (sample 2). Next for a 2-step method, 4 mL of 2 mM $HAuCl_4$ and 3 mL of 3 mM $Na_2S_2O_3$ are reacted for 30 seconds in a 50 mL tube, then added into a 3500 MWCO dialysis membrane with an additional 7 mL of 2 mM $HAuCl_4$ to react for an hour (sample 3). For a non-dialysis sample, 11 mL of 2 mM $HAuCl_4$ and 3 mL of 3 mM $Na_2S_2O_3$ are mixed in a 50 mL tube and reacted for 1 hour (sample 1).

Figure 7:
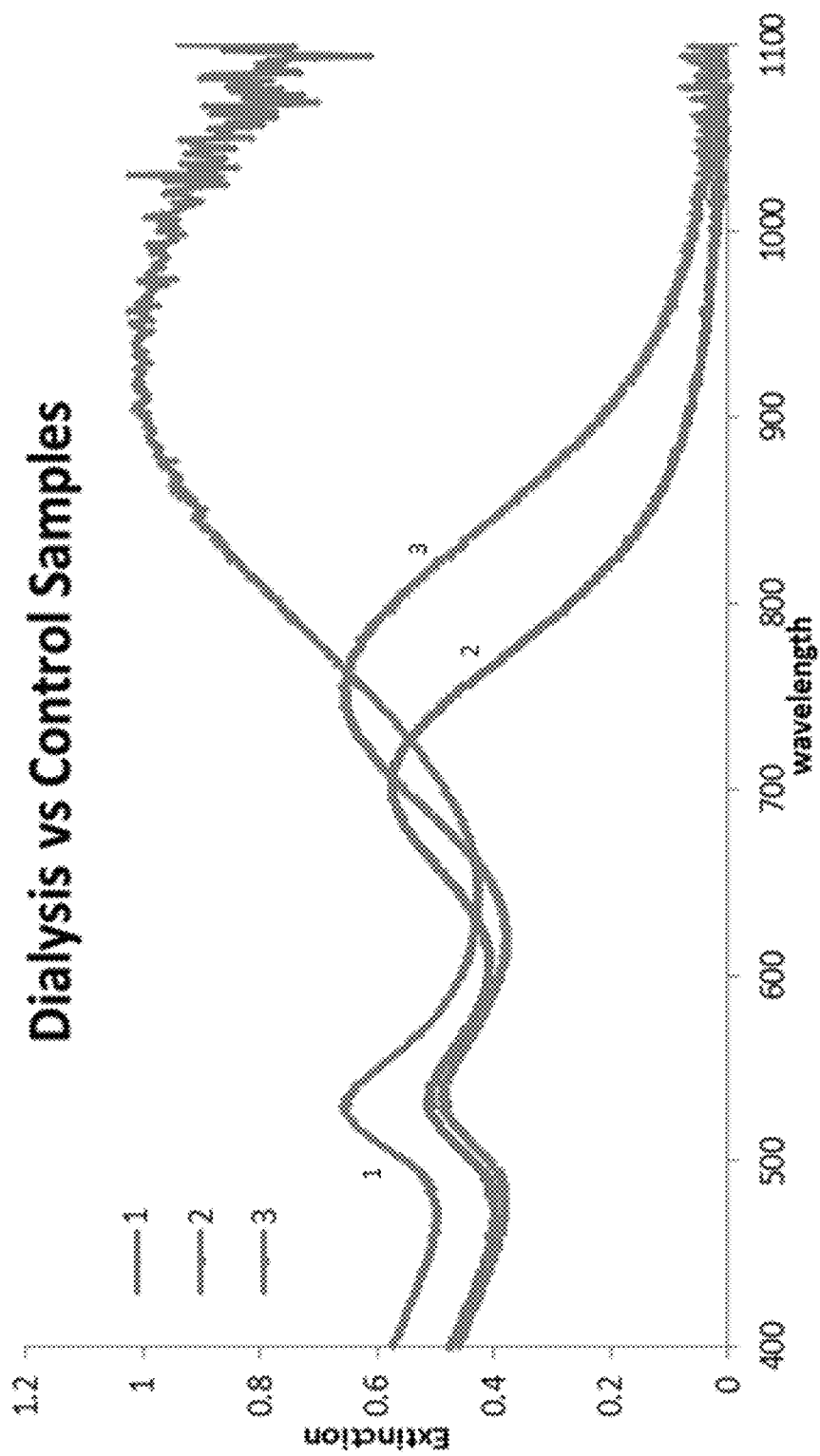
FIG. 7 is a spectral scan of samples from Example 5.

Spectral scans of the samples are shown in FIG. 7. As shown, the two step method of mixing the gold source and sulfide source shortly before insertion into the dialysis membrane resulted in a higher quality ratio, but a lower peak shift, than the one step method disclosed in the '792 and '793 applications.

EXAMPLE 6

Fill an 8 L bucket with DI water and stir bar. Combine samples of 11 mL of 2 mM $HAuCl_4$ and 3 mL of 3 mM $Na_2S_2O_3$ in 3.5 KDa and 12 KDa MWCO dialysis membranes, and allow each to react for an hour (samples 2 and 3 of FIG. 8A). For a 2-step method, react samples of 4 mL of 2 mM $HAuCl_4$ and 3 mL of 3 mM $Na_2S_2O_3$ for 30 seconds, then add 7 mL of 2 mM $HAuCl_4$ and place in 3.5 and 12 KDa MWCO dialysis membranes to allow further reaction for an hour (samples 2 and 3 of FIG. 8B). For a non-dialysis sample, 11 mL of 2 mM $HAuCl_4$ and 3 mL of 3 mM $Na_2S_2O_3$ are mixed in a 50 mL tube and reacted for 1 hour (sample 1 of FIGS. 8A, 8B and 8C). Additionally, the following controls were also synthesized: 2-step, react samples of 4 mL of 2 mM $HAuCl_4$ and 3 mL of 3 mM $Na_2S_2O_3$ for 30 seconds, then add 7 mL of 2 mM $HAuCl_4$ and allow to react for 1 hour (sample 2 of FIG. 8C); 1-step dialysis as above using a 12 KDa MWCO dialysis membrane (sample 3 of FIG. 8C); and 2-step dialysis as above using a 12 KDa MWCO dialysis membrane (sample 4 of FIG. 8C).

Figure 8A:
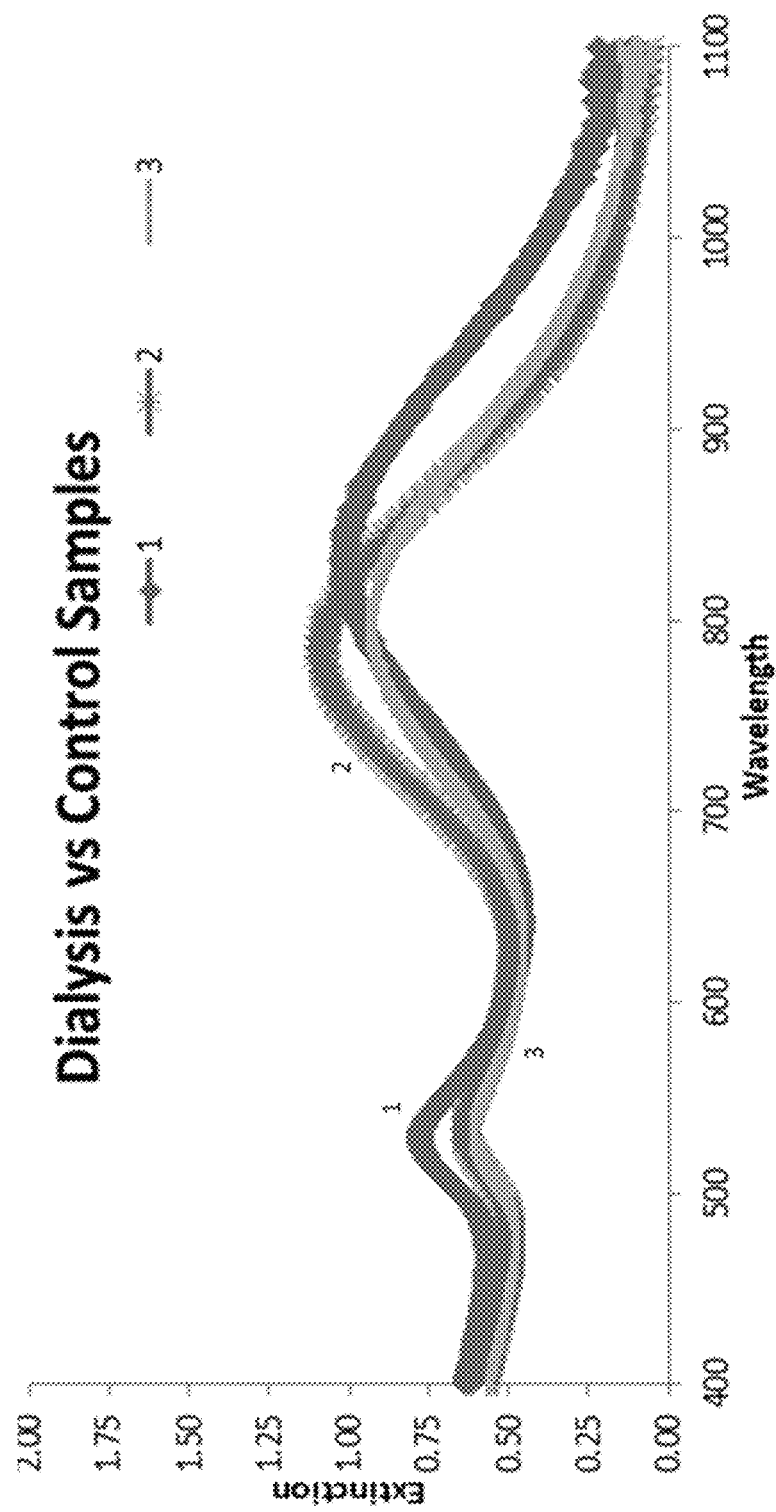
Figure 8C:
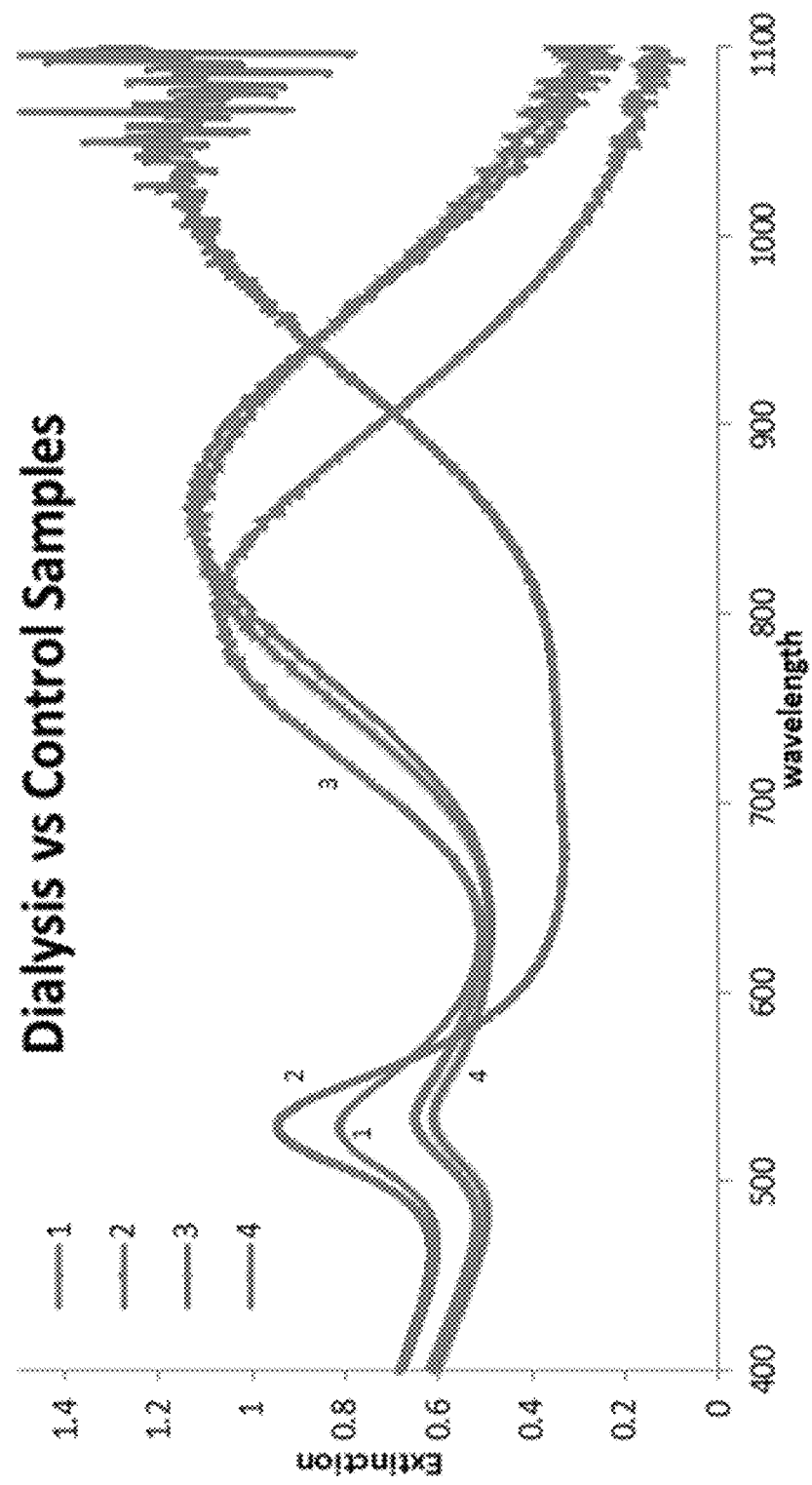

Spectral scans of the samples are shown in FIGS. 8A-8C. In both the 1-step process and 2-step process, dialysis provides a greatly increased quality ratio as compared to the non-dialysis sample, as shown by the relatively small gold colloid peaks. For the 1-step process, FIG. 8A shows that using the 3.5 KDa MWCO dialysis membrane results in a greater peak shift and a higher quality ratio than the 12 KDa MWCO dialysis membrane. In contrast, FIG. 8B shows that using a 3500 MWCO dialysis membrane results in the NIR absorbance peak shifting to a higher wavelength than the non-dialysis sample for the 2-step process. FIG. 8C shows that the two step process, used without dialysis, does not produce a significant fraction of NIR GGS nanoparticles.

EXAMPLE 7

Fill two 1 L beakers with 800 mL of DI water and stir bar. Maintain a water temperature of 65° C. in one of the beakers, while the other is left at room temperature (RT). Add a mixture of 11 mL of 2 mM $HAuCl_4$ and 3 mL of 3 mM $Na_2S_2O_3$ in a 3500 MWCO dialysis membrane to the RT beaker (sample 2) and the 65° C. beaker (sample 3), each for 1 hour. For a non-dialysis sample, 11 mL of 2 mM $HAuCl_4$ and 3 mL of 3 mM $Na_2S_2O_3$ are mixed in a 50 mL tube and reacted for 1 hour (sample 1).

Figure 9:
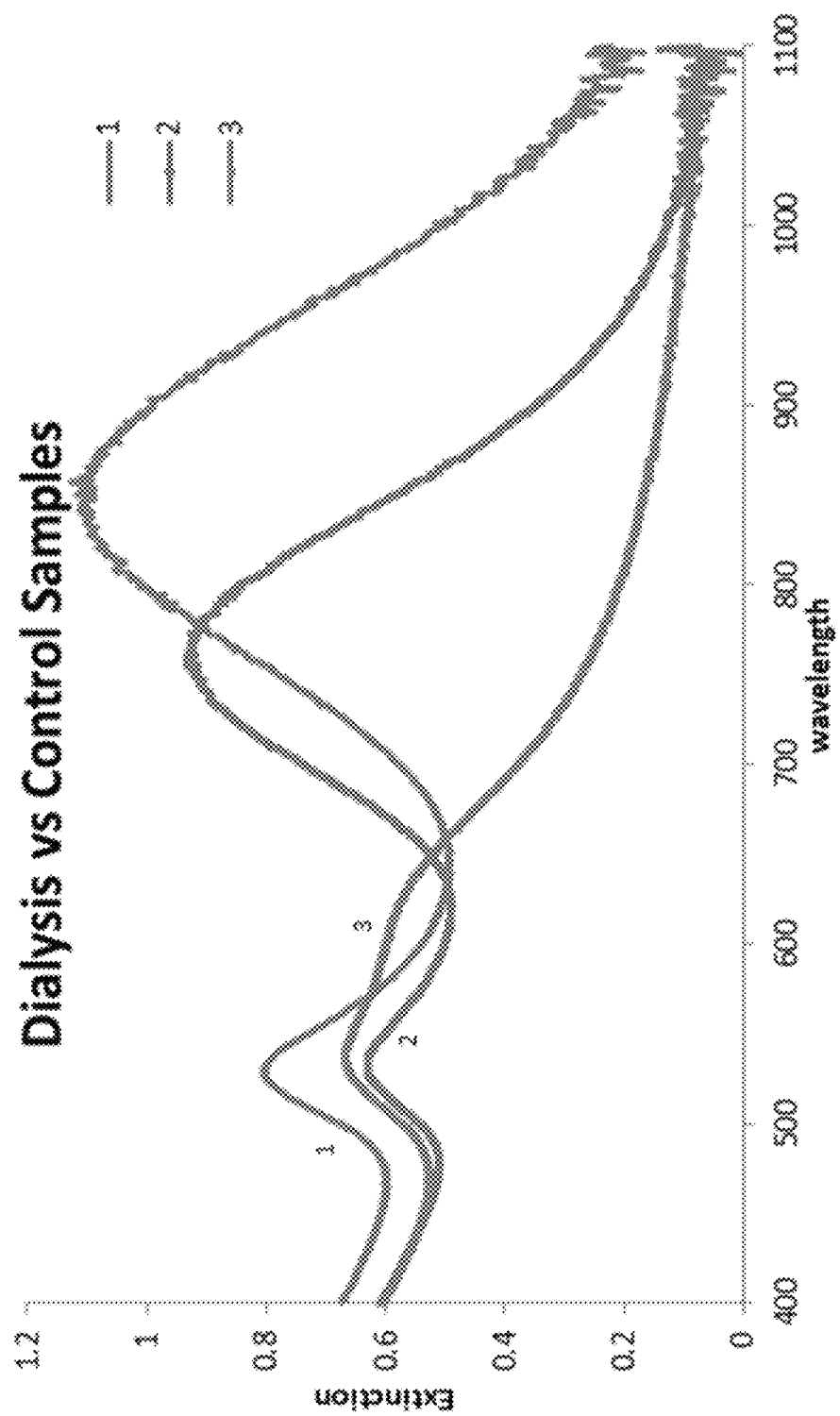
FIG. 9 is a spectral scan of samples from Example 7.

Spectral scans of the samples are shown in FIG. 9. As shown, the yield of GGS nanoparticles, as evidenced by the NIR peak, was significantly greater at RT than at the elevated temperature.

EXAMPLE 8

Fill an 8 L bucket with DI water and stir bar. Add a mixture of 11 mL of 2 mM $HAuCl_4$ and 3 mL of 3 mM $Na_2S_2O_3$ in 2 KDa and 3 KDa MWCO dialysis membranes for 1 hour (samples 2 and 3). For a non-dialysis sample, 11 mL of 2 mM $HAuCl_4$ and 3 mL of 3 mM $Na_2S_2O_3$ are mixed in a 50 mL tube and reacted for 1 hour (sample 1).

Figure 10:
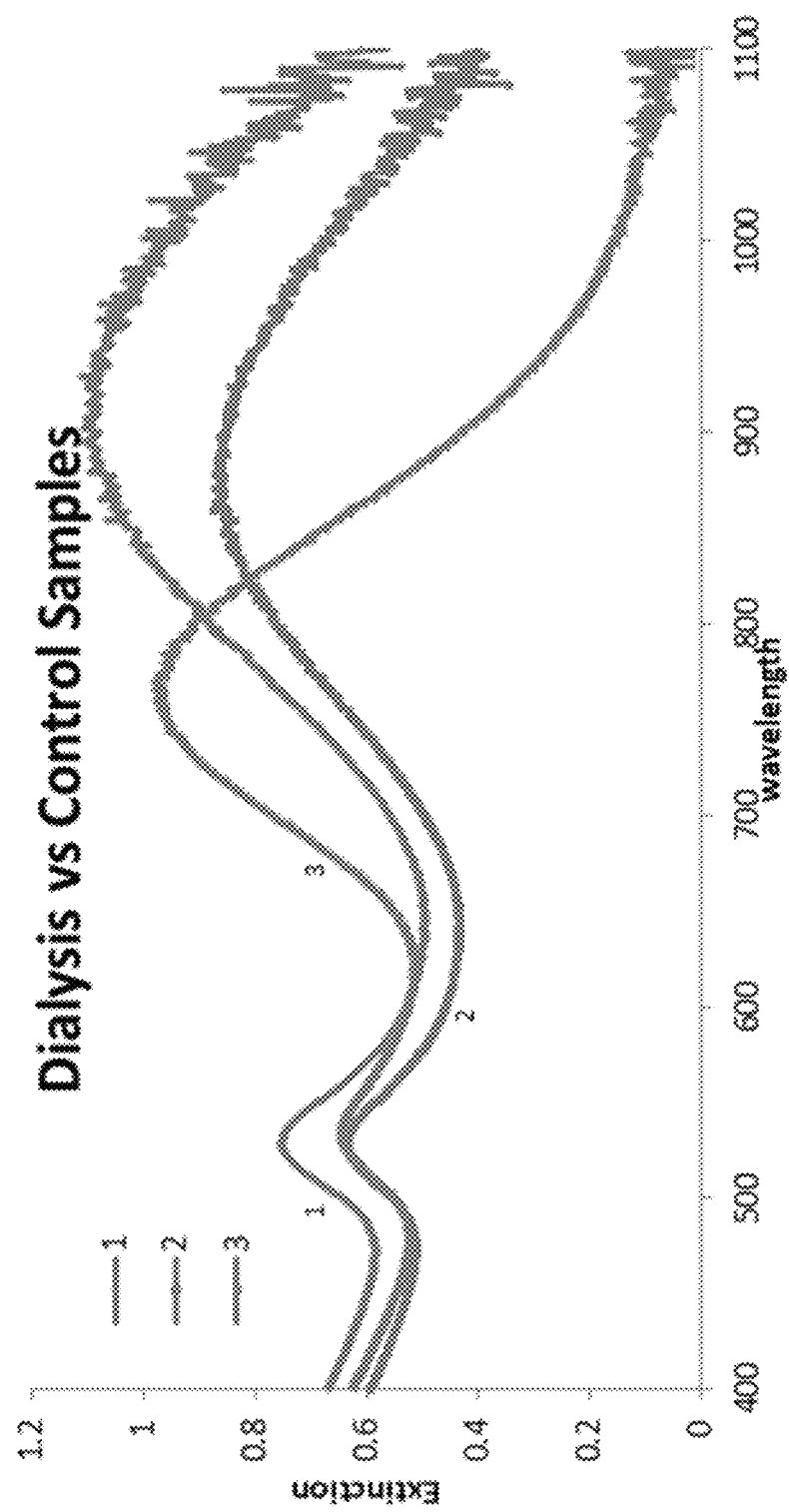
FIG. 10 is a spectral scan of samples from Example 8.

Spectral scans of the samples are shown in FIG. 10. As shown, use of the 3.5 KDa MWCO dialysis membrane provides a significantly larger NIR peak shifts than the 2 KDa MWCO membrane. The following Table 1 is a summary of the absorbance peaks and quality ratios for each sample.

TABLE 1

Summary of Sample Properties in Example 8

| Samples | NIR Absorbance Peak (nm) | Quality Ratio |
| --- | --- | --- |
| Sample 1/No dialysis | 928 | 1.473 |
| Sample 2/2 KDa MWCO | 881 | 1.378 |
| Sample 3/3.5 MWCO | 765 | 1.513 |

EXAMPLE 9

Figure 11A:
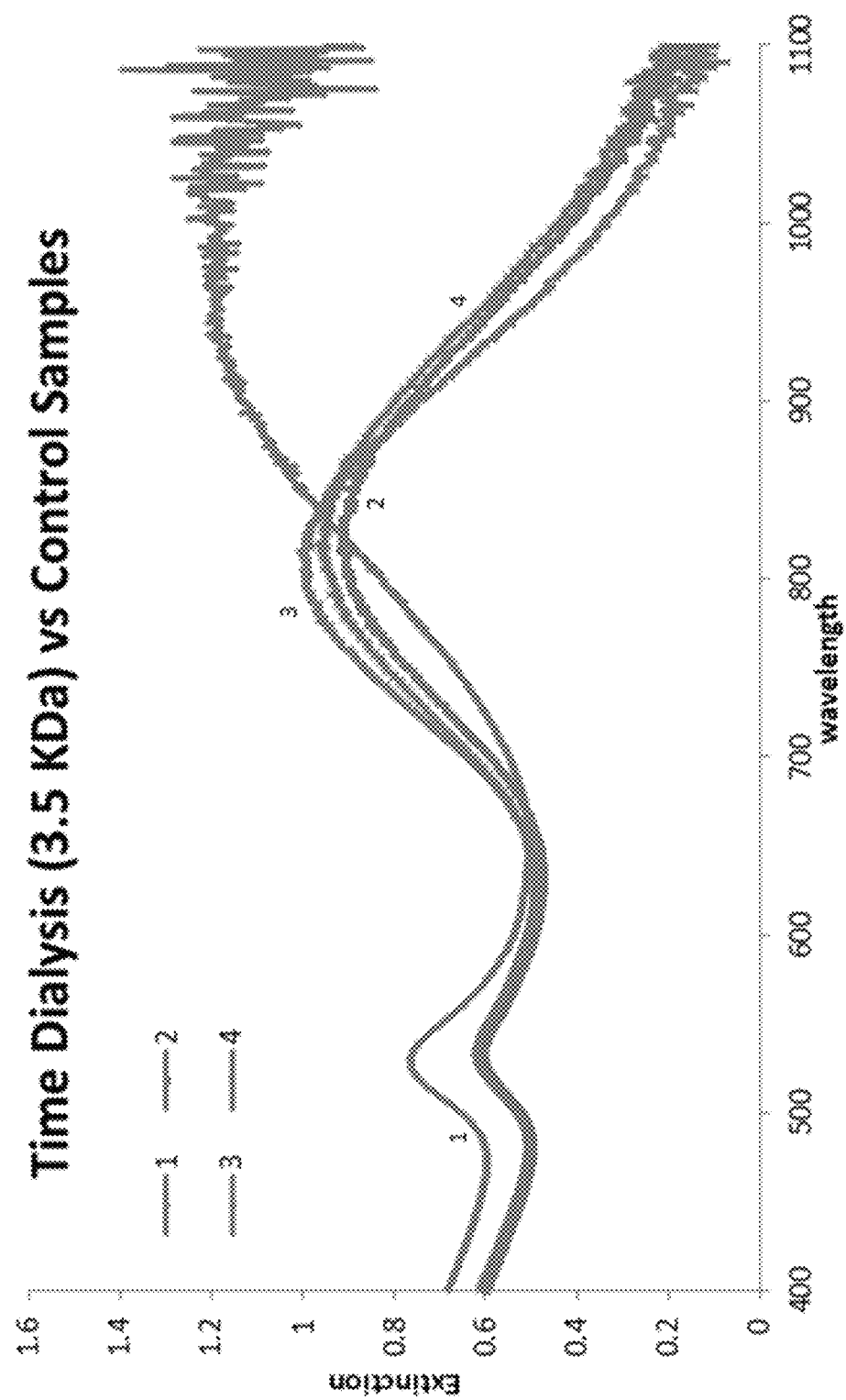
FIGS. 11A-11B are spectral scans of samples from Example 9.
Figure 11B:
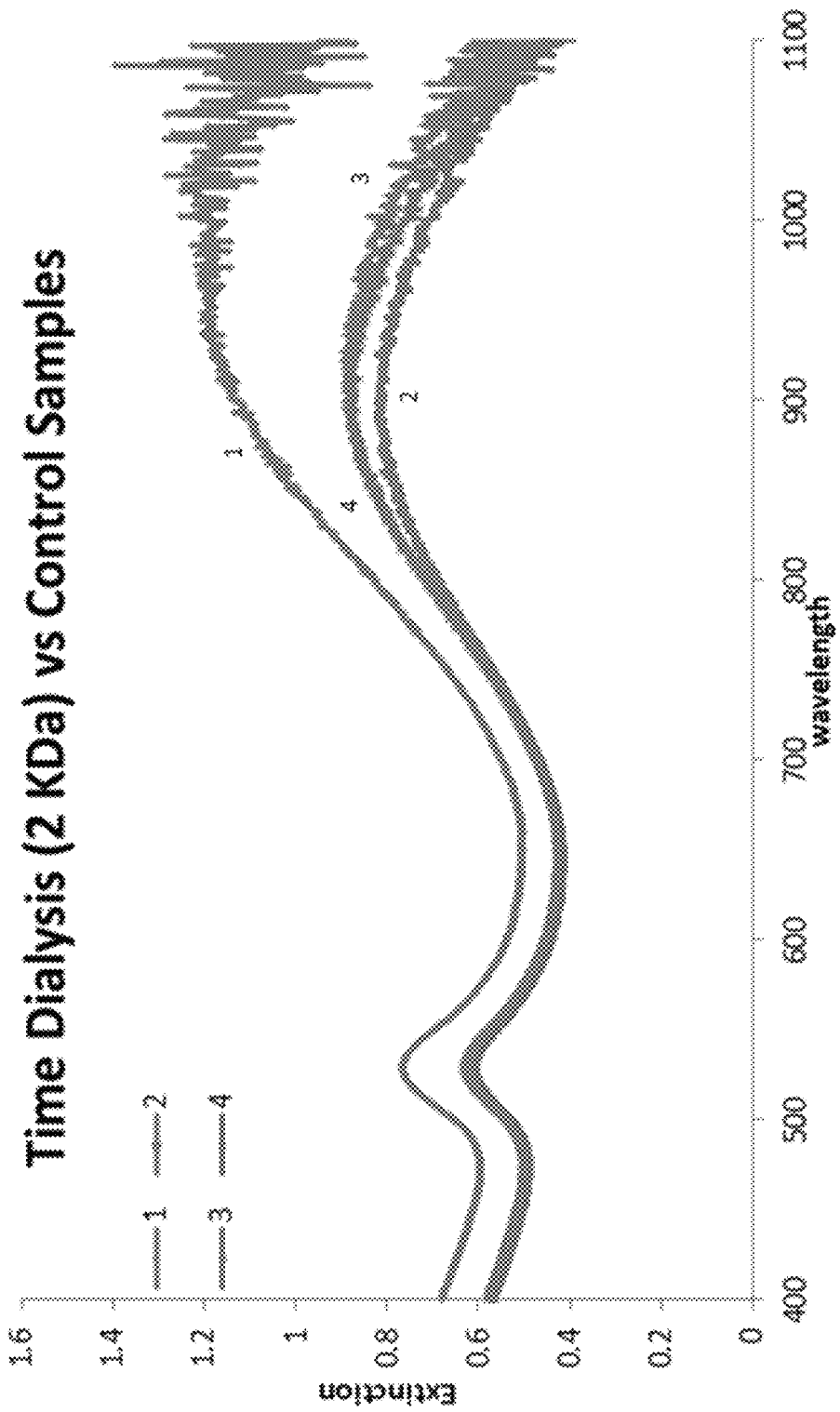

Fill an 8 L bucket with DI water and stir bar. Add mixtures of 11 mL of 2 mM $HAuCl_4$ and 3 mL of 3 mM $Na_2S_2O_3$ in three separate 3.5 KDa MWCO dialysis membranes for 1, 2, and 4 hour, respectively (samples 2, 3, and 4 of FIG. 11A). Fill a separate 8 L bucket with DI water and stir bar. Add mixtures of 11 mL of 2 mM $HAuCl_4$ and 3 mL of 3 mM $Na_2S_2O_3$ in three separate 2 KDa MWCO dialysis membranes for 1, 2, and 4 hours, respectively (samples 2, 3, and 4 of FIG. 11B). For a non-dialysis sample, 11 mL of 2 mM $HAuCl_4$ and 3 mL of 3 mM $Na_2S_2O_3$ are mixed in a 50 mL tube and reacted for 1 hour (sample 1 of FIGS. 11A and 11B). Spectral scans of the samples are shown in FIGS. 11A and 11B.

The following Table 2 is a summary of the absorbance peaks, extinction coefficients, and quality ratios of each sample. For the non-dialyzed "No Dia" control samples, the column "Dialysis Time" simply indicates the delay between mixing the gold and sulfide sources and acquiring the spectral data.

TABLE 2

Summary of Sample Properties in Example 9

| Samples | Dialysis Time (hours) | NIR Absorbance Peak (nm) | Colloid Extinction Coeff. | NIR Extinction Coeff. | Quality Ratio |
| --- | --- | --- | --- | --- | --- |
| No Dia (sample 1, FIGS. 11A and 11B) | 1 | 959 | 0.766 | 1.179 | 1.539 |
| 2K Dia (sample 2, FIG. 11B) | 1 | 899 | 0.605 | 0.821 | 1.357 |
| 2K Dia (sample 3, FIG. 11B) | 2 | 926 | 0.632 | 0.895 | 1.416 |
| 2K Dia (sample 4, FIG. 11B) | 4 | 930 | 0.616 | 0.889 | 1.444 |
| 3.5K Dia (sample 2, FIG. 11A) | 1 | 816 | 0.599 | 0.916 | 1.527 |
| 3.5K Dia (sample 3, FIG. 11A) | 2 | 815 | 0.622 | 1.007 | 1.620 |
| 3.5K Dia (sample 4, FIG. 11A) | 4 | 819 | 0.615 | 0.967 | 1.573 |

EXAMPLE 10

Fill an 8 L bucket with DI water and stir bar. Add mixtures of 11 mL of 2 mM $HAuCl_4$ and 2 mL of 3 mM $Na_2S_2O_3$ in three separate 3.5 KDa MWCO dialysis membranes for 1, 2, and 4 hour, respectively. Also, add mixtures of 11 mL of 2 mM HAuCl$_4$ and 2 mL of 3 mM Na$_2$S$_2$O$_3$ in three separate 2 KDa MWCO dialysis membranes for 1, 2, and 4 hours. For a non-dialysis sample, 11 mL of 2 mM HAuCl$_4$ and 2 mL of 3 mM Na$_2$S$_2$O$_3$ are mixed in a 50 mL tube and reacted for 1 hour.

Figure 12:
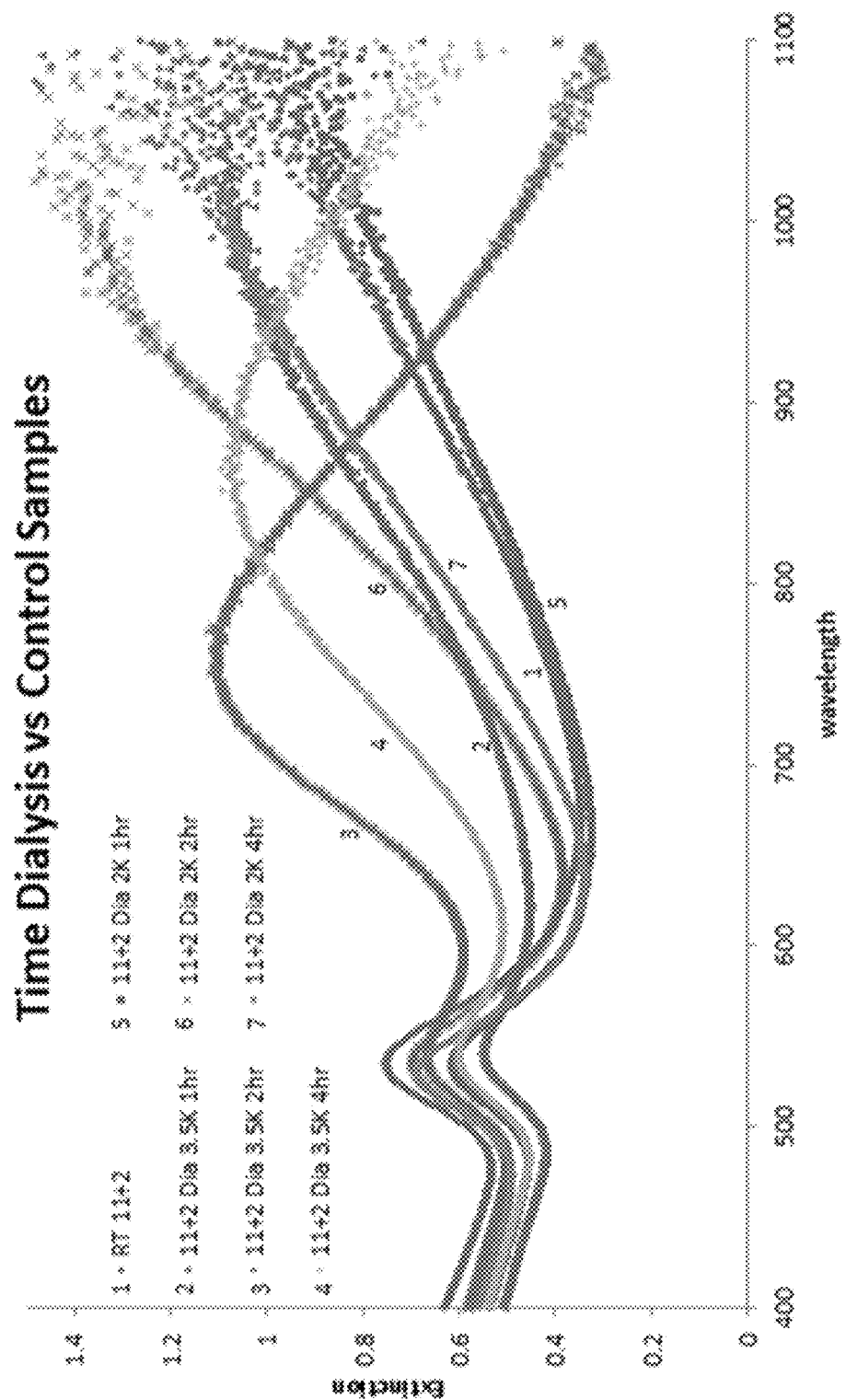
FIG. 12 is a spectral scan of samples from Example 10.

Spectral scans of the samples are shown in FIG. 12. As shown, dialysis using 3.5 KDa MWCO dialysis membranes produced significant peak shifts. Dialysis using 2 KDa MWCO dialysis membranes did not result in distinct peaks in the NIR range.

EXAMPLE 11

Fill an 8 L bucket with DI water and stir bar. Add mixtures of 11 mL of 2 mM HAuCl$_4$ and 2.5, 3, 3.5, 4, 4.5, or 5 mL of 3 mM Na$_2$S$_2$O$_3$ in 50 mL tubes, or 2 KDa or 3.5 KDa MWCO dialysis membranes for 1 hour. The following Table 3 is a summary of the samples, their initial ratios, NIR peaks, and quality ratios. An "Initial ratio" is the ratio of the volume of gold source to the volume of sulfide source in a given sample, the concentrations of the gold source and sulfide source remaining constant between compared samples. For example, 11 mL of 2 mM HAuCl$_4$ and 2.5 mL of 3 mM Na$_2$S$_2$O$_3$ provides an initial ratio of 11/2.5=4.40. Non-dialyzed samples are identified herein as "RT" or room temperature, although all samples were maintained at room temperature throughout the experiment.

TABLE 3

Summary of Sample Properties in Example 11

| Dialysis Method | Sample (vol. gold source + vol. sulfide source) | Initial Ratio | NIR Absorbance Peak (nm) | Quality Ratio |
|---|---|---|---|---|
| RT | 11 + 2.5 | 4.40 | none | N/A |
| RT | 11 + 3 | 3.67 | 995 | 1.675 |
| RT | 11 + 3.5 | 3.14 | 901 | 1.398 |
| RT | 11 + 4 | 2.75 | 852 | 1.126 |
| RT | 11 + 4.5 | 2.44 | 807 | 0.895 |
| RT | 11 + 5 | 2.20 | 779 | 0.730 |
| 2 KDa | 11 + 2.5 | 4.40 | 931 | 1.588 |
| 2 KDa | 11 + 3 | 3.67 | 928 | 1.421 |
| 2 KDa | 11 + 3.5 | 3.14 | 950 | 1.436 |
| 2 KDa | 11 + 4 | 2.75 | 848 | 1.209 |
| 2 KDa | 11 + 4.5 | 2.44 | 771 | 0.783 |
| 2 KDa | 11 + 5 | 2.20 | 771 | 0.787 |
| 3.5 KDa | 11 + 2.5 | 4.40 | 789 | 1.804 |
| 3.5 KDa | 11 + 3 | 3.67 | 816 | 1.731 |
| 3.5 KDa | 11 + 3.5 | 3.14 | 820 | 1.621 |
| 3.5 KDa | 11 + 4 | 2.75 | 834 | 1.352 |
| 3.5 KDa | 11 + 4.5 | 2.44 | 789 | 1.038 |
| 3.5 KDa | 11 + 5 | 2.20 | 747 | 0.787 |

Figure 13A:
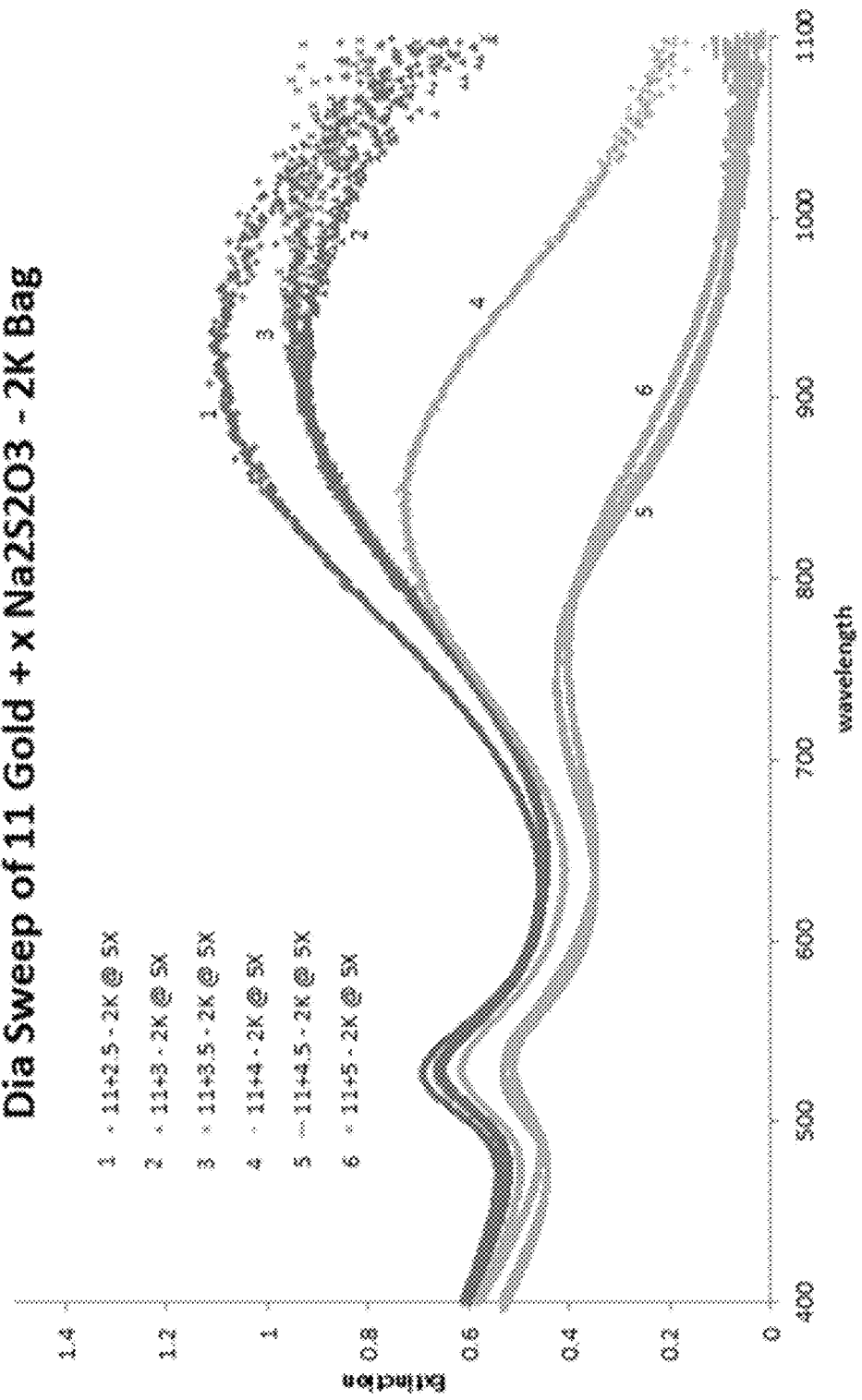
FIGS. 13A-B are spectral scans of samples from Example 11.
Figure 13B:
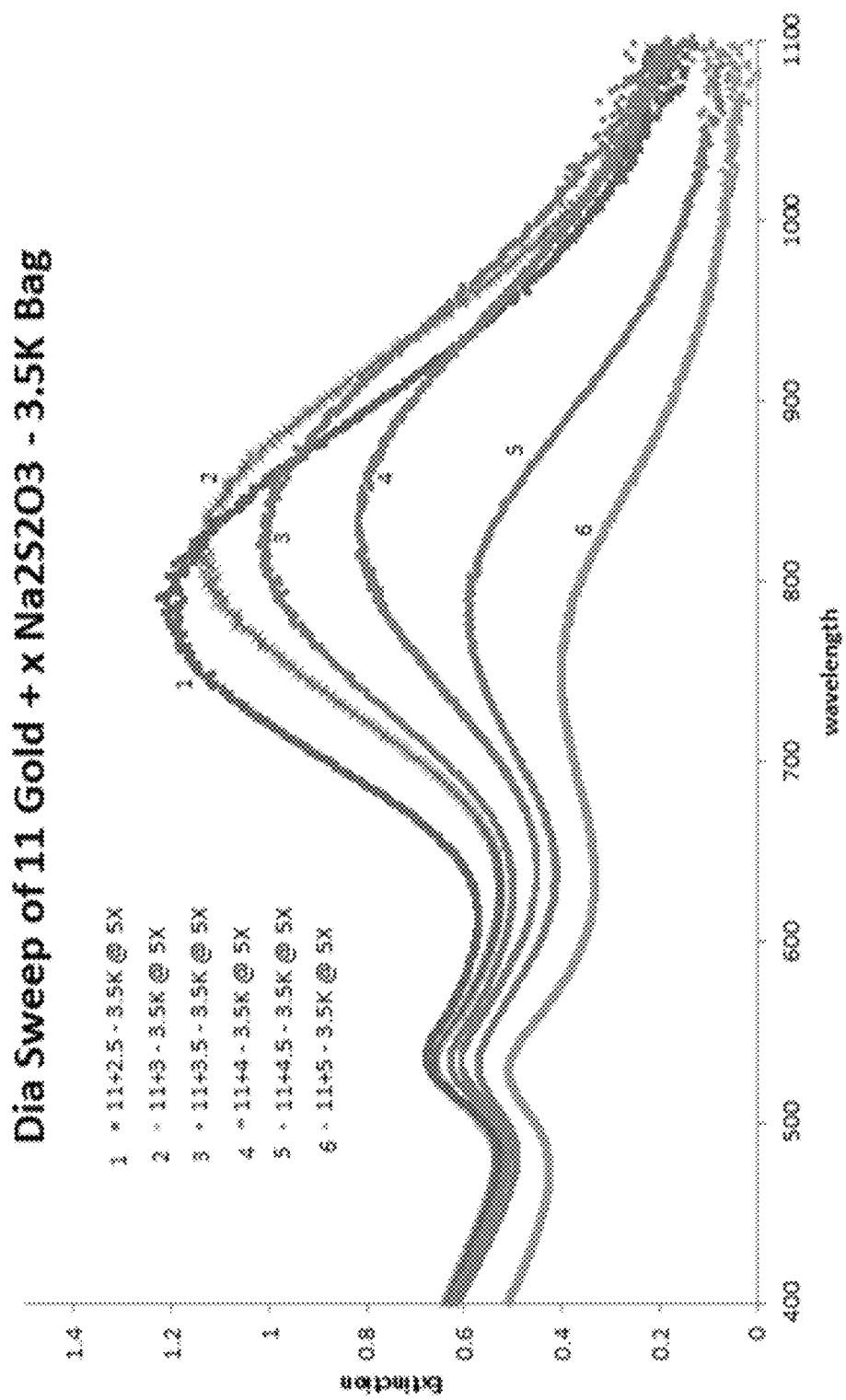
Figure 13C:
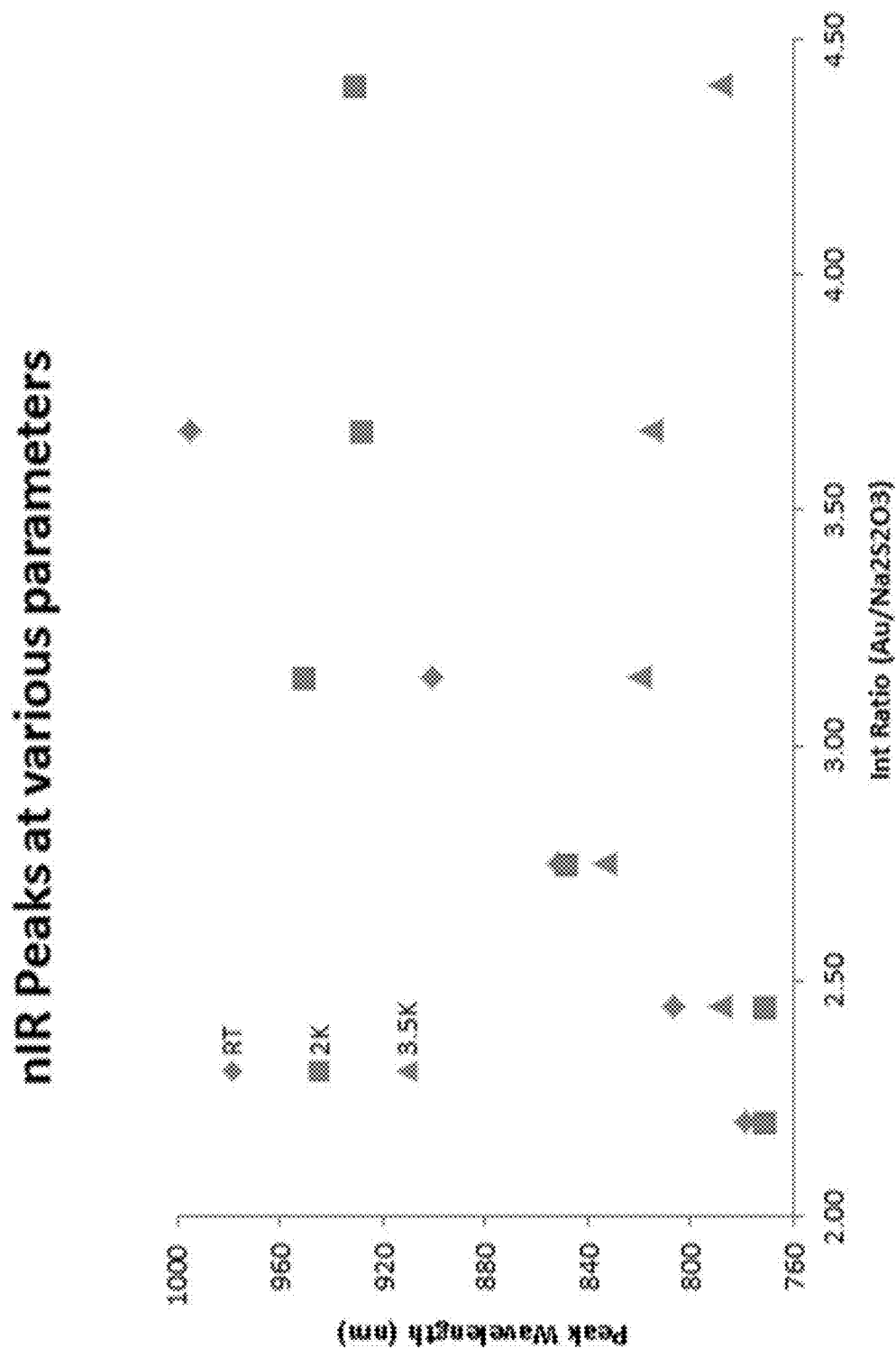
FIG. 13C is a chart showing the relationship between peak wavelength and initial ratio (defined in Example 11 below).
Figure 13D:
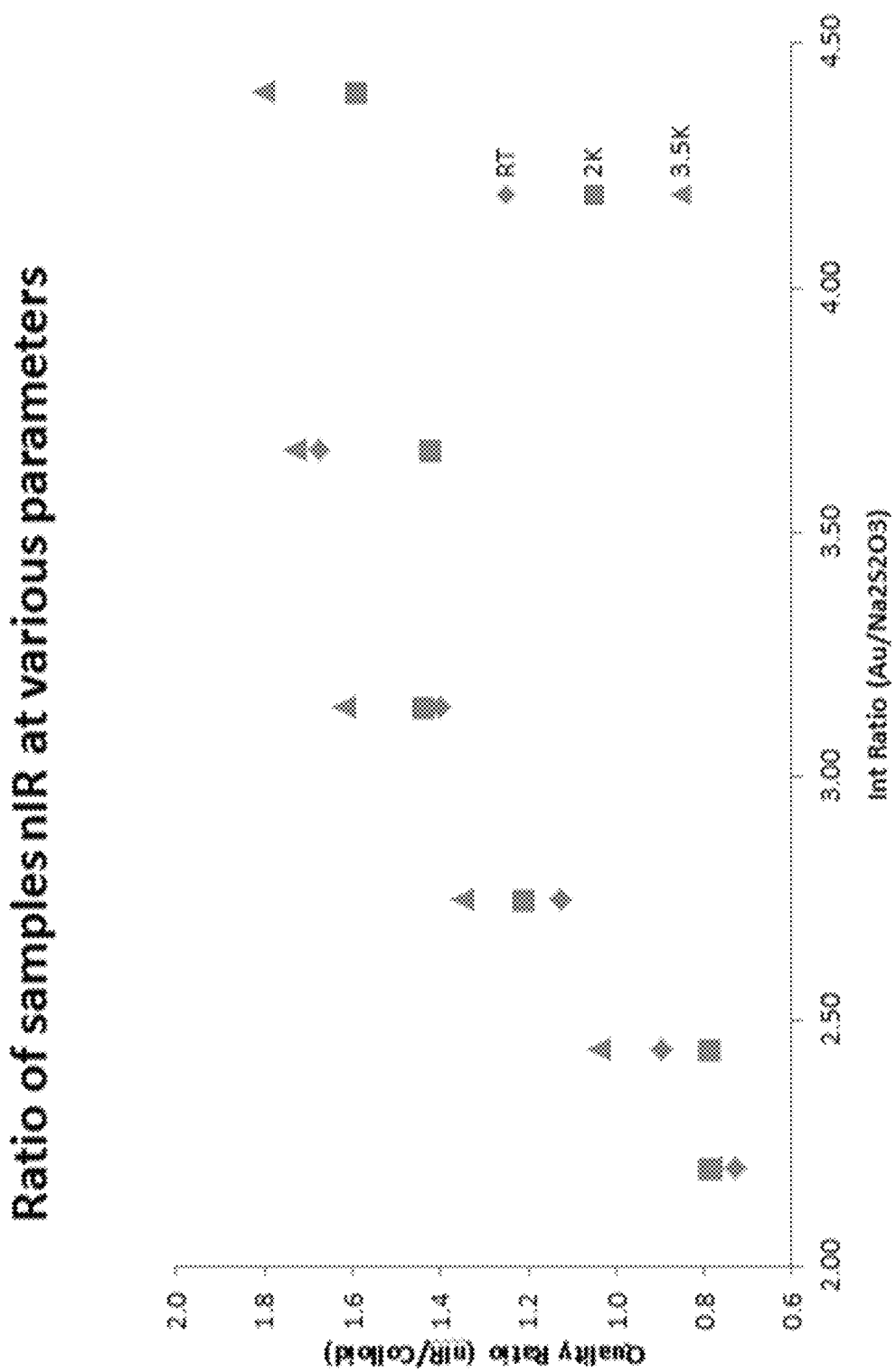
FIG. 13D is a chart showing the relationship between quality ratio and initial ratio.

Spectral scans of selected samples from Table 3 are shown in FIGS. 13A and 13B. More specifically, FIG. 13A includes spectral scans of samples dialyzed in 2 KDa MWCO dialysis membranes and FIG. 13B includes spectral scans of samples dialyzed in 3.5 KDa MWCO dialysis membranes. FIG. 13C depicts the correlation between NIR peak wavelength and initial ratio. FIG. 13D depicts the correlation between quality ratio and initial ratio. Note that in several places in FIGS. 13C and 13D, a diamond symbol identifying a non-dialyzed sample is not visible as it is covered by a square symbol identifying a sample dialyzed in a 2 KDa MWCO dialysis membrane. FIG. 13C indicates that decreasing initial ratios generally correlate with NIR absorbance peaks at lower wavelengths. As shown in FIG. 13D, increasing initial ratios generally correlate with increasing quality ratios.

EXAMPLE 12

For this experiment, molar concentration of reagents and temperature was kept constant while surface area to volume ratio of 12 KDa MWCO dialysis tubing (flat width 43 mm) was adjusted. Varying lengths of dialysis tubing were used to show the effect of surface area of the semipermeable membrane to volume of nanoparticle solution. For example, a dialysis tubing of length 100 mm and width 43 mm has a surface area (for both sides of the tubing) of 8600 mm$^2$ which, when divided by a solution volume of 40 mL, provides a SA/Vol. ratio of 215 mm$^2$/ml. 32.6 mL of 2 mM HAuCl$_4$ was poured into the dialysis tube with one end clipped. 7.4 mL of 3 mM Na$_2$S$_2$O$_3$ was then added in via pipette to the solution, providing a combined solution volume of 40 mL. All air was removed from the dialysis tubing and the open end of the tubing was clipped. The membrane was then placed inside an oven set at 100° C. To increase the membrane surface-to-air interaction, the dialysis membranes were placed on top of plastic pipette tip holders. A sample was recorded every 5 minutes to determine the when the reaction equilibrium point is reached. Table 1 below shows the nIR peak position.

TABLE 4

Effect of membrane surface area to sample volume on NIR peak

| | Dialysis Tubing Length (mm) | | | |
|---|---|---|---|---|
| | 100 | 130 | 175 | 220 |
| | SA/Vol. (mm$^2$/mL) | | | |
| | 215 | 280 | 377 | 473 |
| Time (min) | Wavelength (nm) | | | |
| 5 | 1080 | 1089 | 946 | 843 |
| 10 | 985 | 873 | 753 | 743 |
| 15 | 929 | 797 | 756 | 733 |
| 20 | 831 | 803 | 752 | 730 |
| 25 | 832 | 787 | 751 | 728 |

Figure 14:
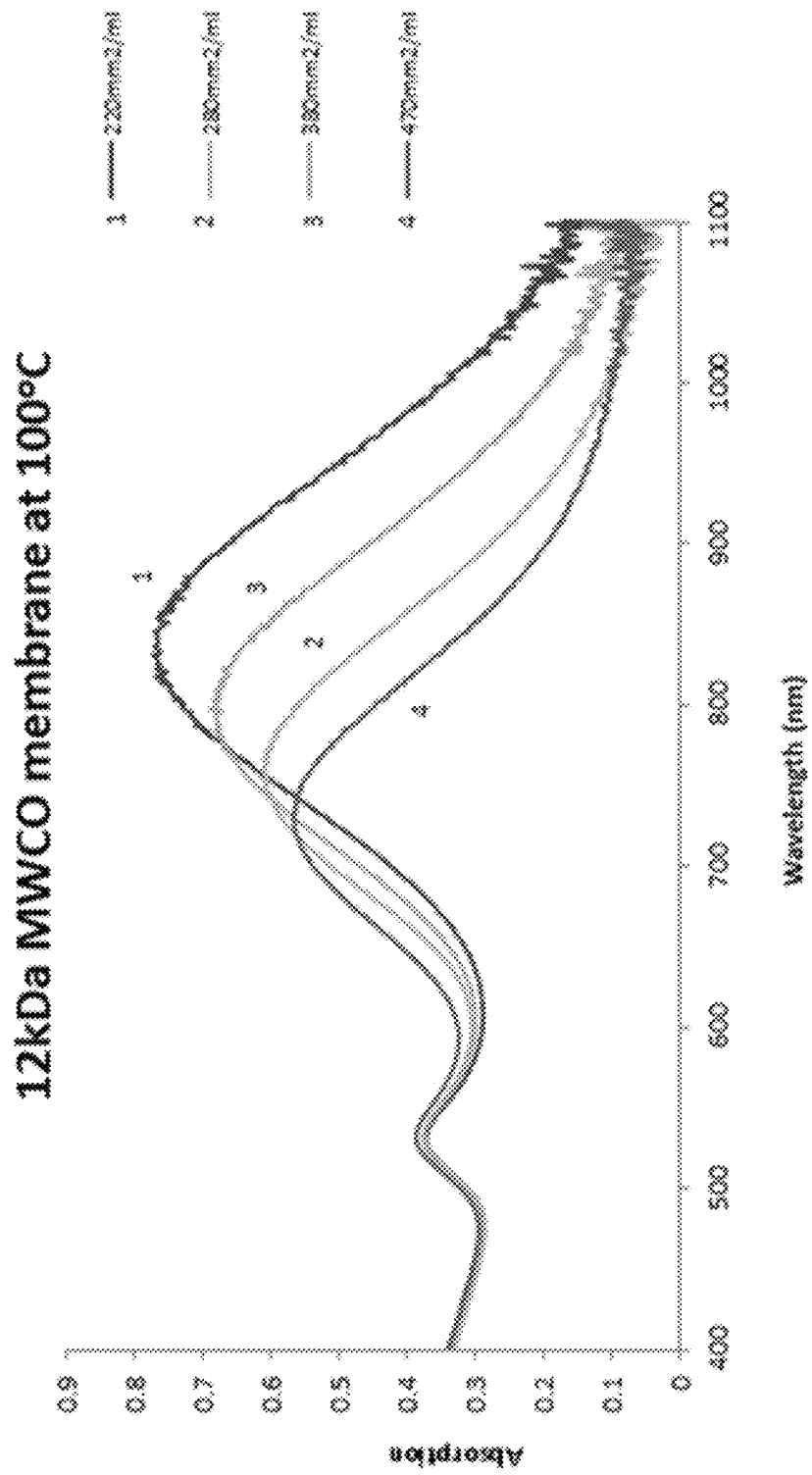
FIG. 14 is a spectral scan of samples from Example 12.

The reaction reached equilibrium after 20 minutes for the 100 mm tubing, 15 minutes for the 130 mm tubing, 10 minutes for the 175 mm tubing, and 10 minutes for the 220 mm tubing. FIG. 14 depicts spectral scans of the nanoparticle solutions at different SA/Vol. ratios, with each depicted sample being the equilibrium sample listed above. As indicated, modification of the SA/Vol. ratio affects the NIR peak of the self-assembling nanoparticles and affects the reaction time to reach equilibrium. For the purposes of this experiment, a reaction is considered to have reached equilibrium when the absorbance peak shifts no more than 5 nm in a 15 minute period.

EXAMPLE 13

Figure 15:
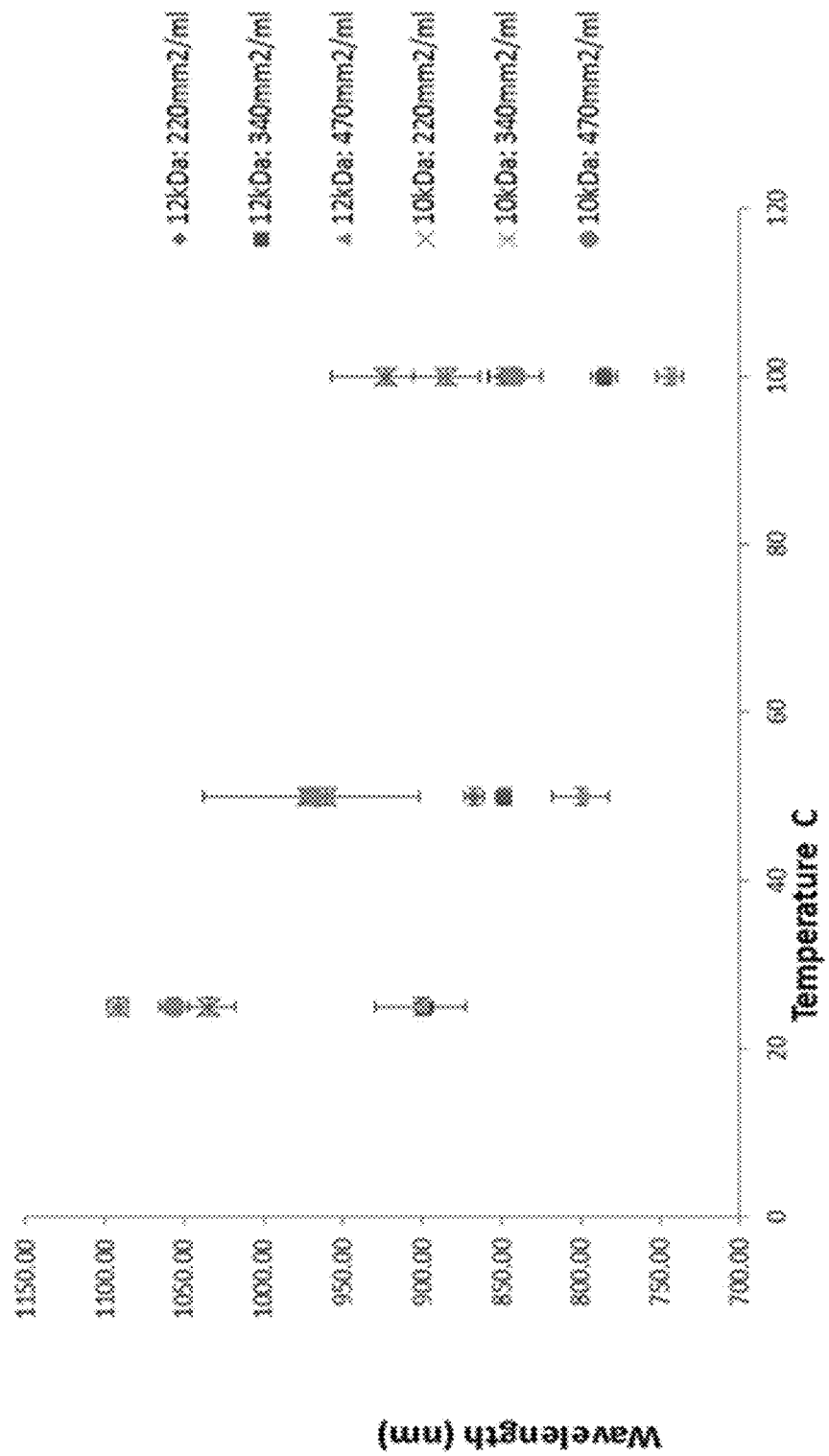
FIG. 15 is a graph comparing NIR peak wavelengths at different temperatures for samples from Example 13 at different SA/Vol. ratios.

For this experiment, molar concentration of reagents was kept constant while surface area to volume ratio, MWCO of the dialysis tubing, and temperature were adjusted. Varying lengths of dialysis tubing were used to show the effect of modifying the SA/Vol. ratio, as described in Example 12. 32.6 mL of 2 mM HAuCl$_4$ was poured into the dialysis tube with one end clipped. 7.4 mL of 3 mM Na$_2$S$_2$O$_3$ was then added in via pipette to the solution. All air was removed from the dialysis tubing and the open end of the tubing was clipped. The membrane was then placed inside an oven set at various temperatures: 100° C., 50° C., and 25° C. To increase the membrane surface-to-air interaction, the dialysis membranes were placed on top of plastic pipette tip holders. A sample was recorded every 10 minutes to determine the when the reaction equilibrium point is reached. Three trials were performed for each set of conditions including the 12 KDa MWCO dialysis tubing while two trials were performed for each set of conditions including the 10 KDa MWCO dialysis tubing. FIG. 15 is a graph plotting the NIR peak detected at different temperatures as the MWCO of the dialysis tubing and the SA/Vol. ratio varies. As shown, dialysis in the 12 KDa MWCO dialysis tubing result in GGS nanoparticle with a lower NIR peak wavelength at a given temperature and SA/Vol. ratio than does dialysis in the 10 KDa MWCO dialysis tubing. Also, higher temperatures result in lower NIR peak wavelengths at given MWCO and SA/Vol. values.

EXAMPLE 14

For this experiment, molar concentration of reagents was kept constant while surface area to volume ratio, MWCO of the dialysis tubing, and temperature were adjusted. Two lengths of dialysis tubing were used to show the effect of modifying the SA/Vol. ratio, as described in Example 12. 32.6 mL of 2 mM $HAuCl_4$ was poured into the 12 KDA MWCO dialysis tube with one end clipped. 7.4 mL of 3 mM $Na_2S_2O_3$ was then added in via pipette to the solution. All air was removed from the dialysis tubing and the open end of the tubing was clipped. The membrane was then placed inside a 2 L beaker filled with DI water with a stir bar on a low setting. Two different water temperatures were used to show the effect of temperature on the reaction: 50 and 25° C. A sample was recorded every 10 minutes to determine the when the reaction equilibrium point is reached. Three trials were performed for each set of conditions.

Figure 16:
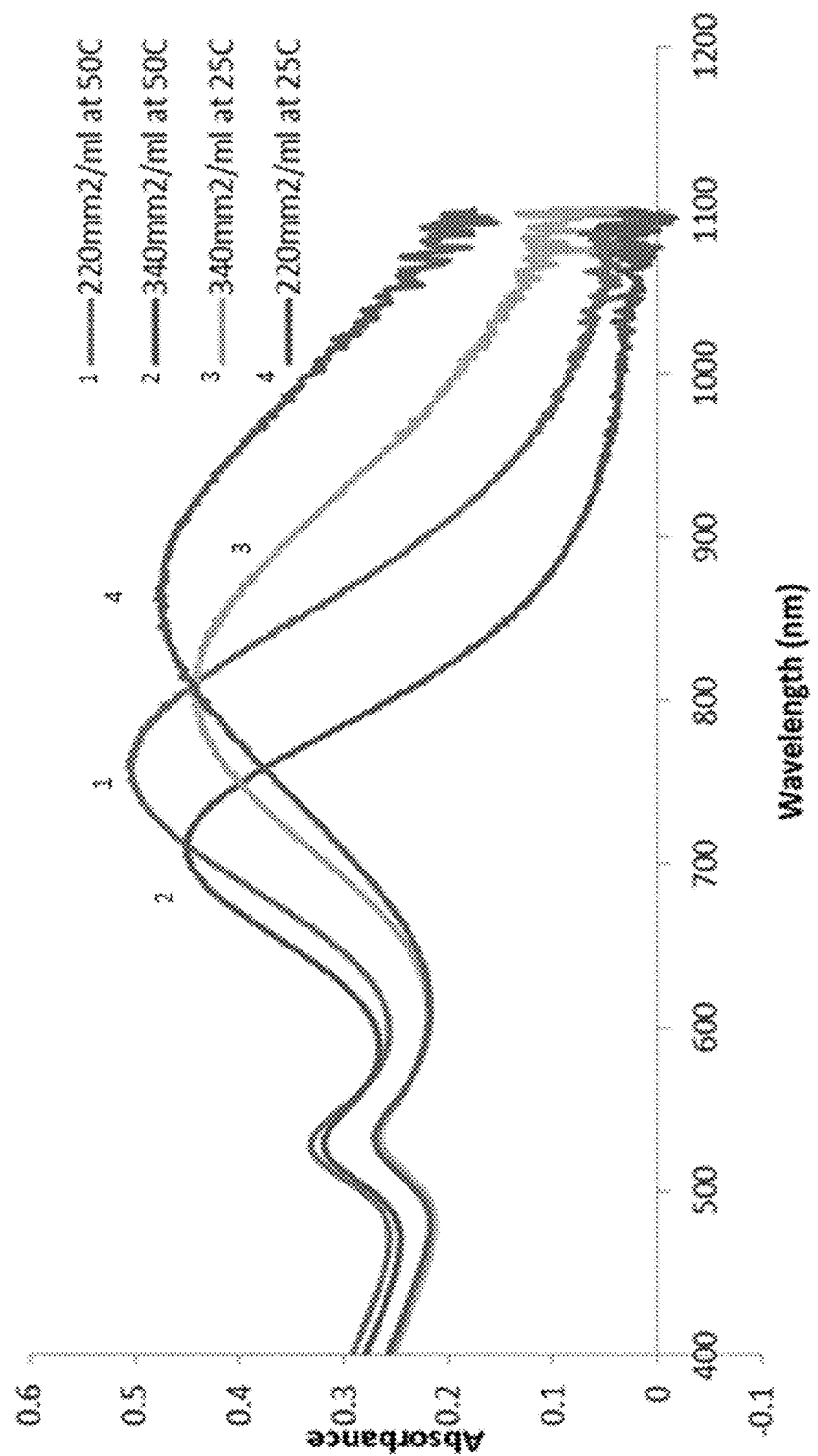
FIG. 16 is a spectral scan of samples from Example 14.

FIG. 16 depicts spectral scans of the nanoparticle solutions at different SA/Vol. ratios and temperatures, with each depicted sample being taken from the time point after reaction equilibrium was reached. As shown in the air-exposed samples in Example 13, the samples dialyzed against water in this example also provided lower NIR peak wavelengths when exposed to higher temperatures. Higher SA/Vol. ratios resulted in lower NIR peak wavelengths at a given temperature.

EXAMPLE 15

For this experiment, molar concentration of reagents was kept constant while surface area to volume ratio, MWCO of the dialysis tubing, and temperature were adjusted. Three lengths of dialysis tubing, 100 mm, 150 mm, and 200 mm, were used to show the effect of modifying the SA/Vol. ratio, as described in Example 12. 32.6 mL of 2 mM $HAuCl_4$ was poured into the 12 KDA MWCO dialysis tube with one end clipped. 7.4 mL of 3 mM $Na_2S_2O_3$ was then added in via pipette to the solution. All air was removed from the dialysis tubing and the open end of the tubing was clipped. The membrane was then placed inside a 2 L beaker filled with DI water with a stir bar on a low setting. Two different water temperatures were used to show the effect of temperature on the reaction: 50° C., 37° C., and 25° C. A sample was recorded every 10 minutes to determine the when the reaction equilibrium point is reached. Three trials were performed for each set of conditions.

Figure 17:
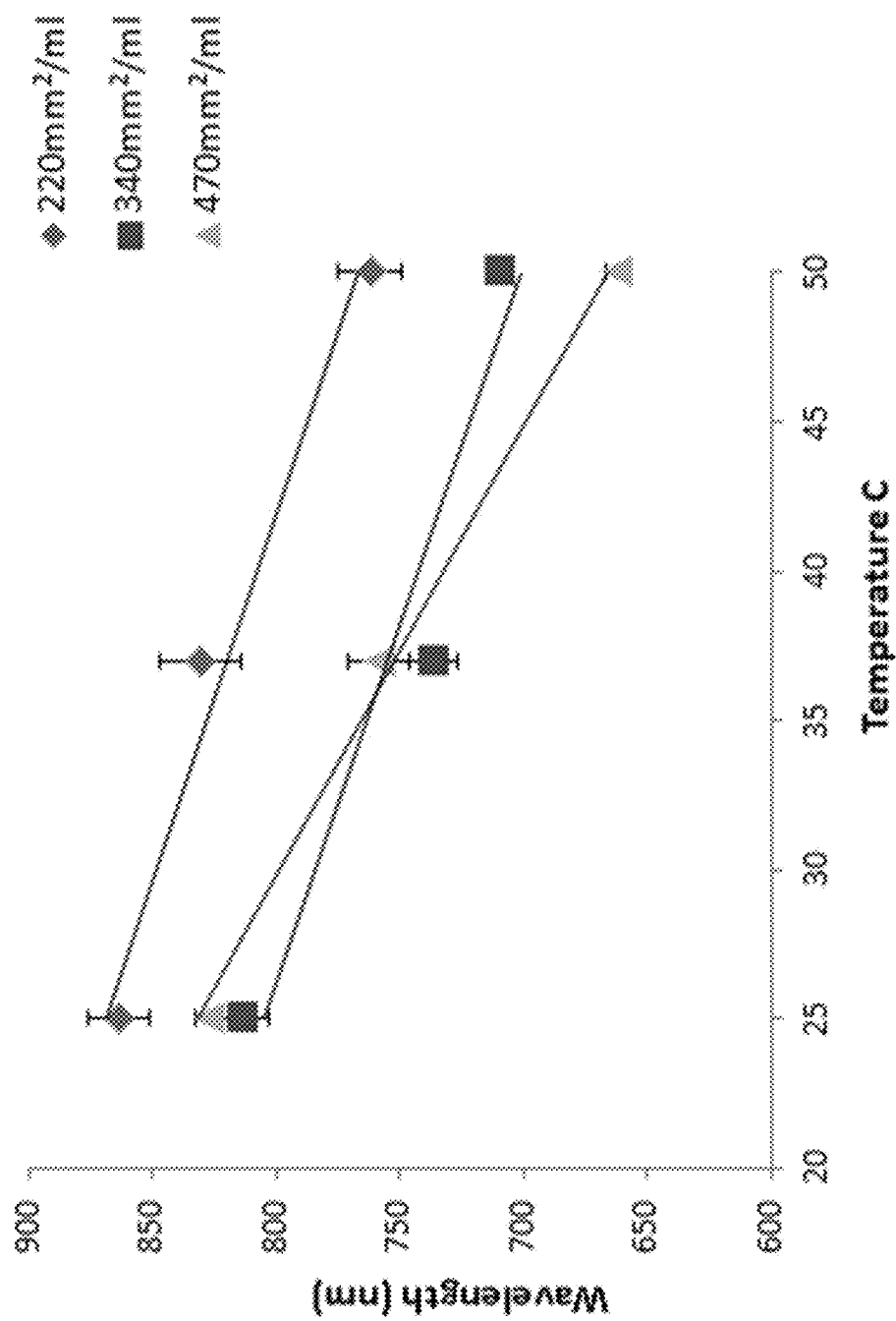
FIG. 17 is a graph comparing NIR peak wavelengths at different temperatures for samples from Example 15 at different SA/Vol. ratios.
Figure 18:
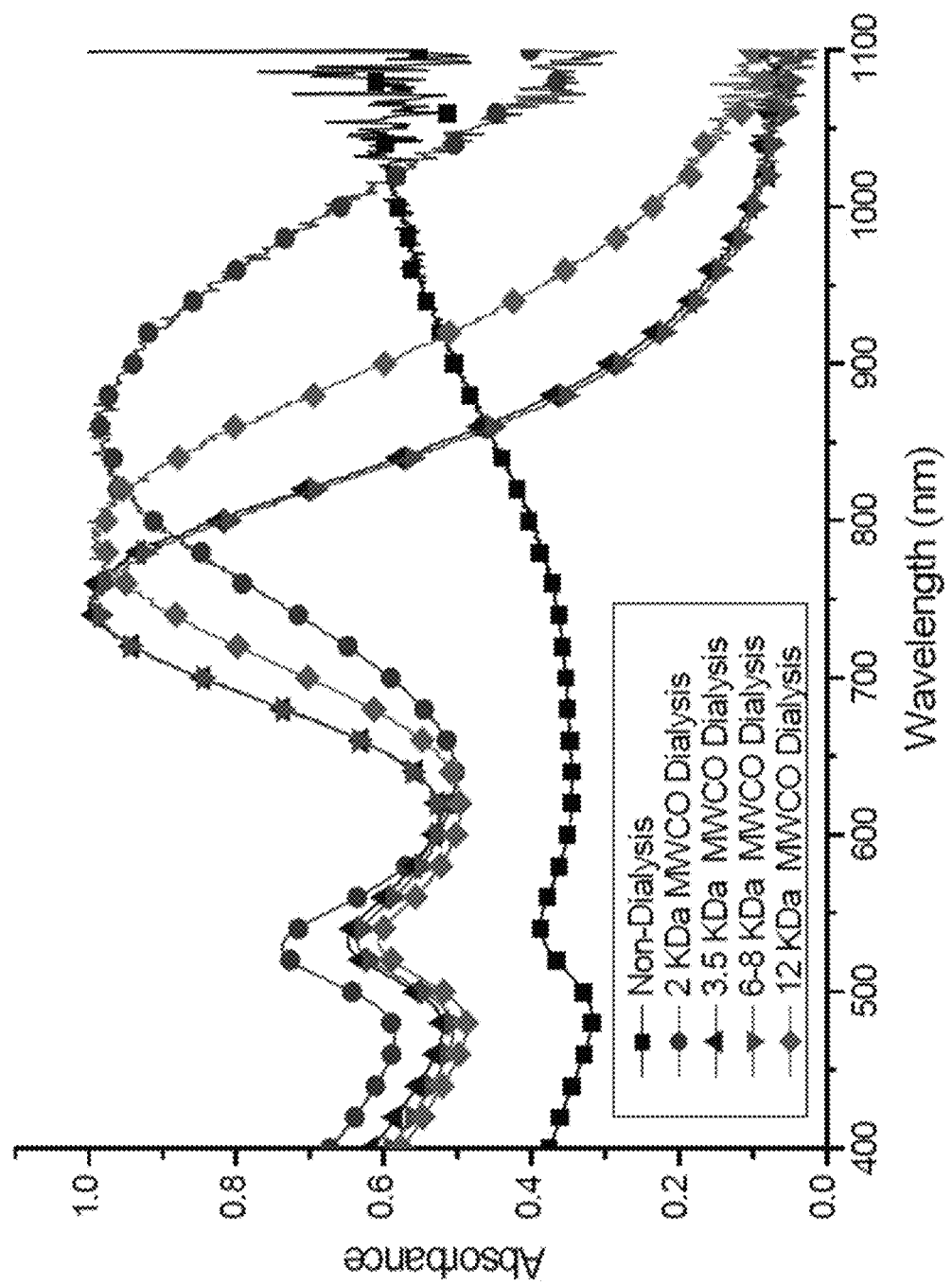
FIG. 18 is a spectral scan of samples from Example 16.

FIG. 17 depicts spectral scans of the nanoparticle solutions at different SA/Vol. ratios and temperatures, with each depicted sample being taken from the time point after reaction equilibrium was reached. As shown in the air-exposed samples in Example 13 and the water-exposed samples in Example 14, the samples in this example also provided lower NIR peak wavelengths when exposed to higher temperatures. At a given temperature, nanoparticles produced from dialysis with SA/Vol. ratios of 340 $mm^2/mL$ and 470 $mm^2/mL$ resulted in had lower NIR peak wavelengths than nanoparticles produced from dialysis with a SA/Vol. ratio of 220 $mm^2/mL$.

EXAMPLE 16

This experiment was designed to compare synthesis of GGS nanoparticles using different dialysis membranes against synthesis without dialysis. Fill four 8 L buckets with 7.5-8 L of DI water and place a stir bar inside each. Next, prepare and add 4 mixtures of 11 mL 2 mM $HAuCl_4$ (added to the dialysis bag first) and 2.5 mL 3 mM $Na_2S_2O_3$ (added to the dialysis bag second) to 2 KDa MWCO, 3.5 KDa MWCO, 6-8 KDa MWCO, and 12 KDa MWCO bag-shaped dialysis membranes separately, and let the samples dialyze for one hour. Then, for a non-dialysis sample, 11 mL 2 mM $HAuCl_4$ and 2.5 mL 3 mM $Na_2S_2O_3$ is mixed in a 50 mL tube and reacted for one hour. Spectral scans are obtained for each sample after an hour of self-assembly synthesis at room temperature using a UV/Vis spectrophotometer (Carey 50 Varian). The spectral scans are shown in FIG. 17, and the detected NIR wavelength peaks and calculated quality ratios are listed in Table 4 below.

TABLE 4

Effect of dialysis membrane MWCO on NIR peak

| Sample | NIR Wavelength Peak (nm) | Quality Ratio |
| --- | --- | --- |
| No Dialysis | 1098 | 2.58 |
| 2 KDa MWCO | 858 | 1.35 |
| 3.5 KDa MWCO | 748 | 1.54 |
| 6-8 KDa MWCO | 744 | 1.57 |
| 12 KDa MWCO | 799 | 1.65 |

As shown in FIG. 17, dialysis using the 12 KDa MWCO dialysis membrane provided the highest quality ratio for samples with NIR peaks in the preferred 700-900 nm range. This was an unexpected result, as the relatively larger pores in the 12 KDa membrane would be less effective at preventing $HAuCl_4$, $Na_2S_2O_3$, and resulting nanoparticles from escaping the interior of the bag-shaped membrane as compared to membranes with smaller pores.

EXAMPLE 17

This experiment was designed to compare the yield of synthesis of GGS nanoparticles using a dialysis membrane against non-dialysis synthesis including separation by centrifugation. For the dialysis sample, $HAuCl_4$ and $Na_2S_2O_3$ was added to a 12 KDa MWCO bag-shaped dialysis membrane, and allowed to dialyze for one hour. Then, for a non-dialysis sample, equal amounts of $HAuCl_4$ and $Na_2S_2O_3$ is mixed in a tube and reacted for one hour. As made, the dialysis method produced a 55 mL nanoparticle solution with an OD of 7.5. The non-dialysis method produced a 55 mL nanoparticle solution with an OD of 2.5. After three rounds of centrifugation, the non-dialysis solution was concentrated to a 0.34 mL solution at an OD of 117. The final quality ratios of the methods were generally equal (2.36 dialysis/2.38 non-dialysis), but the yield from the dialysis method was approximately 10 fold higher (412.5 dialysis/39.8 non-dialysis).

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A method for making hybrid nanoparticles, the method comprising:
    combining a gold source and a sulfide source in a first chamber, the first chamber being separated from a second chamber by a semipermeable membrane,
    wherein the gold source and sulfide source self-assemble into hybrid nanoparticles, wherein the second chamber contains a dialysate, and
    wherein the gold source and sulfide source in the first chamber are dialyzed against the dialysate in the second chamber for a period of time, and further comprising adjusting the period of time to achieve a desired absorbance peak for the nanoparticles.

2. The method of claim 1, wherein the hybrid nanoparticles comprise gold and gold sulfide.

3. The method of claim 1, wherein the gold source is a gold salt.

4. The method of claim 3, wherein the gold source is one of chloroauric acid, sodium tetrachloroaureate(III) dehydrate, or a mixture thereof.

5. The method of claim 1, wherein the sulfide source is a sulfide salt.

6. The method of claim 5, wherein the sulfide source is one of sodium thiosulfate, sodium sulfide, or a mixture thereof.

7. The method of claim 1, wherein the combining occurs at room temperature.

8. The method of claim 1, wherein the nanoparticles have an absorbance peak between 700 nm and 1100 nm.

9. The method of claim 1, wherein the nanoparticles have a tunable absorbance peak.

10. The method of claim 1, further comprising controlling the absorbance peak by adjusting the ratio of gold source and sulfide source.

11. The method of claim 1, wherein the semipermeable membrane has a molecular weight cut off, and further comprising controlling the absorbance peak by selecting the molecular weight cut off of the semipermeable membrane.

12. The method of claim 11, wherein the molecular weight cut off is between about 2 KDa and 20 KDa.

13. The method of claim 11, wherein the molecular weight cut off is about 12 KDa.

14. The method of claim 1, wherein the semipermeable membrane has a surface area and where the gold source and sulfide source have a combined volume, and further comprising controlling the absorbance peak by adjusting a ratio of the surface area to the combined volume.

15. The method of claim 14, wherein the ratio of the surface area to the combined volume is between about 220 $mm^2/mL$ and about 470 $mm^2/mL$.

16. The method of claim 1, wherein the combining occurs at a temperature, and further comprising controlling the absorbance peak by adjusting the temperature.

17. The method of claim 1, wherein nanoparticles have a quality ratio greater than 1.8, without centrifugation of the nanoparticles.

18. The method of claim 1, wherein the nanoparticles have a quality ratio greater than 2.0, without centrifugation of the nanoparticles.

19. The method of claim 1, wherein the nanoparticles have a quality ratio greater than 2.3, without centrifugation of the nanoparticles.

20. A method for making a hybrid nanoparticle, the method comprising:
    adding a first chemical species to a first chamber; and
    adding a second chemical species to a second chamber, the first chamber being separated from a second chamber by a semipermeable membrane having a molecular weight cut off;
    wherein the first chemical species and second chemical species self-assemble into hybrid nanoparticles, and
    wherein the first chemical species is a gold source and the second chemical species is a sulfide source.

21. A method for self-assembly of hybrid nanoparticles, the method comprising:
    separating a first chamber from a second chamber using a semipermeable membrane;
    adding a gold source and a sulfide source to the first chamber; and
    adding a dialysate to the second chamber;
    whereby production of gold/gold sulfide nanoparticles is greater in the first chamber than in the second chamber, and whereby production of gold colloid is greater in the second chamber than in the first chamber.

22. The method of claim 21, wherein the dialysate is one of water, a salt solution, a glycerol solution, or sodium citrate.

* * * * *